United States Patent
Matsuo et al.

(10) Patent No.: US 11,996,562 B2
(45) Date of Patent: May 28, 2024

(54) BINDER COMPOSITION FOR NON-AQUEOUS SECONDARY BATTERY ELECTRODE, SLURRY COMPOSITION FOR NON-AQUEOUS SECONDARY BATTERY ELECTRODE, ELECTRODE FOR NON-AQUEOUS SECONDARY BATTERY, AND NON-AQUEOUS SECONDARY BATTERY

(71) Applicant: ZEON CORPORATION, Tokyo (JP)

(72) Inventors: Yusaku Matsuo, Tokyo (JP); Kenya Sonobe, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 926 days.

(21) Appl. No.: 16/970,380

(22) PCT Filed: Jan. 31, 2019

(86) PCT No.: PCT/JP2019/003483
§ 371 (c)(1),
(2) Date: Aug. 17, 2020

(87) PCT Pub. No.: WO2019/159706
PCT Pub. Date: Aug. 22, 2019

(65) Prior Publication Data
US 2020/0411867 A1 Dec. 31, 2020

(30) Foreign Application Priority Data

Feb. 19, 2018 (JP) .................. 2018-027230

(51) Int. Cl.
*H01M 4/62* (2006.01)
*C08F 265/10* (2006.01)
*C08L 51/06* (2006.01)
*H01M 4/131* (2010.01)
*H01M 4/139* (2010.01)
*H01M 4/525* (2010.01)
*H01M 10/0525* (2010.01)
*H01M 4/02* (2006.01)

(52) U.S. Cl.
CPC ........... *H01M 4/622* (2013.01); *C08F 265/10* (2013.01); *C08L 51/06* (2013.01); *H01M 4/131* (2013.01); *H01M 4/139* (2013.01); *H01M 4/525* (2013.01); *H01M 10/0525* (2013.01); *C08L 2203/206* (2013.01); *H01M 2004/028* (2013.01)

(58) Field of Classification Search
CPC ....... C08L 51/06; C08F 265/02; C08F 265/10
See application file for complete search history.

(56) References Cited

U.S. PATENT DOCUMENTS

| | | | |
|---|---|---|---|
| 9,941,518 B2 | 4/2018 | Sakurai et al. | |
| 2013/0330622 A1 | 12/2013 | Sasaki | |
| 2019/0027756 A1 | 1/2019 | Narutomi et al. | |

FOREIGN PATENT DOCUMENTS

| | | | | |
|---|---|---|---|---|
| CN | 105637686 A | 6/2016 | | |
| EP | 2693532 A1 | 2/2014 | | |
| JP | 2012204303 A | 10/2012 | | |
| JP | 2013145763 A | 7/2013 | | |
| WO | WO-2011001848 A1 | * | 1/2011 | ........ H01M 10/0525 |
| WO | 2012115096 A1 | 8/2012 | | |
| WO | 2017154949 A1 | 9/2017 | | |
| WO | 2018008555 A1 | 1/2018 | | |
| WO | WO-2018008555 A1 | * | 1/2018 | ............... A61F 5/04 |

OTHER PUBLICATIONS

Aug. 27, 2020, International Preliminary Report on Patentability issued in the International Patent Application No. PCT/JP2019/003483.
Oct. 6, 2021, the Extended European Search Report issued by the European Patent Office in the corresponding European Patent Application No. 19754010.7.
Jiuyang Zhang et al., Design of Graft Block Polymer Thermoplastics, Macromolecules, Dec. 1, 2016, pp. 9108-9118, vol. 49, No. 23.

* cited by examiner

Primary Examiner — Vu A Nguyen
(74) Attorney, Agent, or Firm — KENJA IP LAW PC

(57) ABSTRACT

Provided is a binder composition for a non-aqueous secondary battery electrode that can inhibit electrode swelling associated with repeated charging and discharging while also causing a secondary battery to display excellent cycle characteristics. The binder composition contains a graft copolymer having a structure in which a branch polymer is bonded to a backbone polymer. The backbone polymer includes a hydroxyl group-containing vinyl monomer unit in a proportion of not less than 5 mass % and not more than 89 mass % and has a weight-average molecular weight of not less than $1.0 \times 10^6$ and not more than $2.0 \times 10^7$. The branch polymer includes a water-soluble monomer unit that is formed from a water-soluble monomer having a solubility of not less than 0.01 g/100 g-$H_2O$ and not more than 25 g/100 g-$H_2O$ at a temperature of 20° C.

13 Claims, No Drawings

BINDER COMPOSITION FOR NON-AQUEOUS SECONDARY BATTERY ELECTRODE, SLURRY COMPOSITION FOR NON-AQUEOUS SECONDARY BATTERY ELECTRODE, ELECTRODE FOR NON-AQUEOUS SECONDARY BATTERY, AND NON-AQUEOUS SECONDARY BATTERY

TECHNICAL FIELD

The present disclosure relates to a binder composition for a non-aqueous secondary battery electrode, a slurry composition for a non-aqueous secondary battery electrode, an electrode for a non-aqueous secondary battery, and a non-aqueous secondary battery.

BACKGROUND

Non-aqueous secondary batteries (hereinafter, also referred to simply as "secondary batteries") such as lithium ion secondary batteries have characteristics such as compact size, light weight, high energy-density, and the ability to be repeatedly charged and discharged, and are used in a wide variety of applications. Consequently, in recent years, studies have been made to improve battery members such as electrodes for the purpose of achieving even higher secondary battery performance.

An electrode for a secondary battery typically includes an electrode mixed material layer. The electrode mixed material layer is formed by applying, onto a current collector, a composition (slurry composition for a non-aqueous secondary battery electrode) in the form of a slurry containing an electrode active material, a binder composition for a non-aqueous secondary battery electrode containing a polymer that acts as a binder, and so forth that are dispersed in a dispersion medium, and then drying the applied composition, for example.

In recent years, attempts have been made to improve binder compositions used in the formation of electrode mixed material layers in order to achieve further improvement of secondary battery performance (for example, refer to Patent Literature (PTL) 1).

PTL 1 reports that a binder composition containing a graft copolymer that is obtained through grafting of monomer having (meth)acrylonitrile as a main component with respect to polyvinyl alcohol having an average degree of polymerization of 300 to 3,000 and a degree of saponification of 70 mol % to 100 mol % and in which the polyvinyl alcohol content and the poly(meth)acrylonitrile content are each within a specific range has good binding capacity with an active material or metal foil and has excellent resistance to reduction. PTL 1 also discloses that by using this binder composition to form a negative electrode, it is possible to enhance cycle characteristics of a lithium ion secondary battery.

CITATION LIST

Patent Literature

PTL 1: WO2017/154949A1

SUMMARY

Technical Problem

However, when the conventional binder composition described above has been used to produce an electrode, there has been a problem that swelling of the electrode associated with repeated charging and discharging cannot be inhibited. Moreover, it has not been possible to sufficiently enhance cycle characteristics of a secondary battery with an electrode obtained using such a binder composition.

Therefore, the conventional binder composition described above leaves room for improvement in terms of inhibiting electrode swelling associated with repeated charging and discharging while also causing a secondary battery to display excellent cycle characteristics.

Accordingly, one object of the present disclosure is to provide a binder composition for a non-aqueous secondary battery electrode and a slurry composition for a non-aqueous secondary battery electrode that can inhibit electrode swelling associated with repeated charging and discharging while also causing a secondary battery to display excellent cycle characteristics.

Another object of the present disclosure is to provide an electrode for a non-aqueous secondary battery for which swelling associated with repeated charging and discharging is inhibited and that can cause a secondary battery to display excellent cycle characteristics.

Yet another object of the present disclosure is to provide a non-aqueous secondary battery having excellent cycle characteristics.

Solution to Problem

The inventors conducted diligent investigation with the aim of solving the problems set forth above. The inventors discovered that by using a binder composition that contains a graft copolymer having a structure in which a branch polymer including a specific monomer unit is bonded to a backbone polymer including a hydroxyl group-containing vinyl monomer unit in a proportion within a specific range and having a weight-average molecular weight within a specific range, it is possible to inhibit electrode swelling associated with repeated charging and discharging and to cause a secondary battery to display excellent cycle characteristics. In this manner, the inventors completed the present disclosure.

Specifically, the present disclosure aims to advantageously solve the problems set forth above, and a presently disclosed binder composition for a non-aqueous secondary battery electrode comprises a graft copolymer having a structure in which a branch polymer is bonded to a backbone polymer, wherein the backbone polymer includes a hydroxyl group-containing vinyl monomer unit in a proportion of not less than 5 mass % and not more than 89 mass % and has a weight-average molecular weight of not less than $1.0 \times 10^6$ and not more than $2.0 \times 10^7$, and the branch polymer includes a water-soluble monomer unit that is formed from a water-soluble monomer having a solubility of not less than 0.01 g/100 g-$H_2O$ and not more than 25 g/100 g-$H_2O$ at a temperature of 20° C. By using a binder composition that contains the specific graft copolymer set forth above, it is possible to produce an electrode for which swelling associated with repeated charging and discharging is inhibited and that can cause a secondary battery to display excellent cycle characteristics.

The phrase "includes a monomer unit" as used with respect to a polymer in the present disclosure means that "a polymer obtained with the monomer includes a repeating unit derived from the monomer".

Moreover, the "proportion (mass %)" in which each monomer unit is included in a polymer can be measured by a nuclear magnetic resonance (NMR) method such as $^1$H-NMR.

Furthermore, the "solubility" (g/100 g-$H_2O$) of a monomer at a temperature of 20° C. can be measured by the EPA method (EPA Chemical Fate Testing Guideline CG-1500 Water Solubility).

In the presently disclosed binder composition for a non-aqueous secondary battery electrode, the backbone polymer preferably includes an ethylenically unsaturated carboxylic acid monomer unit in a proportion of not less than 1 mass % and not more than 50 mass % and a (meth)acrylamide monomer unit in a proportion of not less than 10 mass % and not more than 60 mass %. When the backbone polymer used in production of the graft copolymer has the chemical composition set forth above, electrode swelling associated with repeated charging and discharging can be further inhibited while also further improving cycle characteristics. The viscosity stability of a slurry composition produced using the binder composition can also be improved. Moreover, in a situation in which an electrode is produced using a slurry composition that is produced using the binder composition, it is possible to inhibit the electrode regaining thickness (i.e., spring-back of the electrode occurring) after having undergone a pressing process in which the thickness of the electrode has been reduced. Furthermore, close adherence of an electrode mixed material layer and a current collector in an obtained electrode (i.e., peel strength of the electrode) can be improved. It is also possible to increase the flexibility of an electrode while also inhibiting metal deposition on the electrode.

Note that in the present disclosure, "(meth)acryl" is used to indicate "acryl" and/or "methacryl".

In the presently disclosed binder composition for a non-aqueous secondary battery electrode, the backbone polymer preferably has a glass-transition temperature of not lower than −10° C. and not higher than 150° C. When the backbone polymer used in production of the graft copolymer has a glass-transition temperature within the range set forth above, flexibility of an obtained electrode can be increased, and electrode swelling associated with repeated charging and discharging can be further inhibited while also further improving cycle characteristics of a secondary battery.

Note that the "glass-transition temperature" referred to in the present disclosure can be measured by a method described in the EXAMPLES section of the present specification.

In the presently disclosed binder composition for a non-aqueous secondary battery electrode, the backbone polymer more preferably has a glass-transition temperature of not lower than 90° C. and not higher than 150° C. When the backbone polymer used in production of the graft copolymer has a glass-transition temperature within the range set forth above, flexibility of an obtained electrode can be increased, and electrode swelling associated with repeated charging and discharging can be even further inhibited while also particularly improving cycle characteristics of a secondary battery.

In the presently disclosed binder composition for a non-aqueous secondary battery electrode, the graft copolymer preferably has a grafting ratio of not less than 0.5 mass % and not more than 200 mass %. By using a graft copolymer having a grafting ratio within the range set forth above, flexibility and peel strength of an obtained electrode can be increased, and cycle characteristics of a secondary battery can be further improved. Moreover, disadvantageous effects resulting from the proportion constituted by the branch polymer in the graft copolymer being too high can be avoided.

Note that the "grafting ratio" of a graft copolymer referred to in the present disclosure is the mass ratio of a branch polymer that is bonded to a backbone polymer through graft copolymerization (mass of branch polymer/mass of backbone polymer) and can be measured by a method described in the EXAMPLES section of the present specification.

In the presently disclosed binder composition for a non-aqueous secondary battery electrode, the graft copolymer more preferably has a grafting ratio of not less than 0.5 mass % and less than 10 mass %. By using a graft copolymer having a grafting ratio within the range set forth above, flexibility and peel strength of an obtained electrode can be increased, and cycle characteristics of a secondary battery can be particularly improved.

In the presently disclosed binder composition for a non-aqueous secondary battery electrode, the graft copolymer preferably has a degree of swelling in electrolyte solution of more than a factor of 1 and not more than a factor of 2. By using a graft copolymer having a degree of swelling in electrolyte solution within the range set forth above, cycle characteristics of a secondary battery can be further improved.

Note that the "degree of swelling in electrolyte solution" of a polymer, such as a graft copolymer, referred to in the present disclosure can be measured by a method described in the EXAMPLES section of the present specification.

In the presently disclosed binder composition for a non-aqueous secondary battery electrode, the graft copolymer preferably has a solubility of 1 g/100 g-$H_2O$ or more at a temperature of 20° C. By using a graft copolymer having a solubility (20° C.) in water of 1 g/100 g-$H_2O$ or more (i.e., that is water-soluble), electrode swelling associated with repeated charging and discharging can be further inhibited while also further improving cycle characteristics. The viscosity stability of a slurry composition can also be increased. Moreover, deposition of metal such as lithium on an electrode can be inhibited, and rate characteristics of a secondary battery can be improved.

Note that the "solubility at a temperature of 20° C." (g/100 g-$H_2O$) of a polymer, such as a graft copolymer, referred to in the present disclosure can be measured by a method described in the EXAMPLES section of the present specification.

The presently disclosed binder composition for a non-aqueous secondary battery electrode preferably further comprises a particulate polymer. By using a binder composition containing a particulate polymer, peel strength and flexibility of an electrode can be increased, and cycle characteristics of a secondary battery can be further improved.

Note that the "particulate polymer" referred to in the present disclosure is a polymer that has a particulate form, at least in the binder composition, and is normally a water-insoluble polymer. The particulate form of a particulate polymer can be confirmed by laser diffraction, for example.

Moreover, the present disclosure aims to advantageously solve the problems set forth above, and a presently disclosed slurry composition for a non-aqueous secondary battery electrode comprises: an electrode active material; and any one of the binder compositions for a non-aqueous secondary battery electrode set forth above. When an electrode is formed using a slurry composition that contains any one of the binder compositions set forth above in this manner, swelling of the electrode associated with repeated charging and discharging is inhibited, and the electrode can cause a secondary battery to display excellent cycle characteristics.

Furthermore, the present disclosure aims to advantageously solve the problems set forth above, and a presently disclosed electrode for a non-aqueous secondary battery comprises an electrode mixed material layer formed using the slurry composition for a non-aqueous secondary battery electrode set forth above. When an electrode includes an electrode mixed material layer formed from the slurry composition set forth above in this manner, swelling of the electrode associated with repeated charging and discharging is inhibited, and the electrode can cause a secondary battery to display excellent cycle characteristics.

In the presently disclosed electrode for a non-aqueous secondary battery, the electrode mixed material layer may have a mass per unit area of 10.0 mg/cm$^2$ or more. Flexibility of the electrode can be ensured even in a case in which an electrode mixed material layer having a mass per unit area of 10.0 mg/cm$^2$ or more is formed.

Also, the present disclosure aims to advantageously solve the problems set forth above, and a presently disclosed non-aqueous secondary battery comprises any one of the electrodes for a non-aqueous secondary battery set forth above. A secondary battery that includes an electrode formed using any one of the slurry compositions set forth above has excellent cycle characteristics.

Advantageous Effect

According to the present disclosure, it is possible to provide a binder composition for a non-aqueous secondary battery electrode and a slurry composition for a non-aqueous secondary battery electrode that can inhibit electrode swelling associated with repeated charging and discharging while also causing a secondary battery to display excellent cycle characteristics.

Moreover, according to the present disclosure, it is possible to provide an electrode for a non-aqueous secondary battery for which swelling associated with repeated charging and discharging is inhibited and that can cause a secondary battery to display excellent cycle characteristics.

Furthermore, according to the present disclosure, it is possible to provide a non-aqueous secondary battery having excellent cycle characteristics.

DETAILED DESCRIPTION

The following provides a detailed description of embodiments of the present disclosure.

The presently disclosed binder composition for a non-aqueous secondary battery electrode can be used in production of a slurry composition for a non-aqueous secondary battery electrode. Moreover, a slurry composition for a non-aqueous secondary battery electrode produced using the presently disclosed binder composition for a non-aqueous secondary battery electrode can be used in formation of an electrode mixed material layer included in an electrode of a non-aqueous secondary battery such as a lithium ion secondary battery (i.e., an electrode for a non-aqueous secondary battery). Furthermore, a feature of the presently disclosed non-aqueous secondary battery is that an electrode for a non-aqueous secondary battery including an electrode mixed material layer formed from the presently disclosed slurry composition for a non-aqueous secondary battery electrode is used therein.

(Binder Composition for Non-Aqueous Secondary Battery Electrode)

The presently disclosed binder composition contains a specific graft copolymer having a structure in which a branch polymer is bonded to a backbone polymer and may optionally further contain a particulate polymer (excluding particulate polymers that correspond to the aforementioned graft copolymer), a solvent, and other components.

<Graft Copolymer>

A backbone polymer that forms a backbone part of the graft copolymer contained in the presently disclosed binder composition includes a hydroxyl group-containing vinyl monomer unit in a proportion of not less than 5 mass % and not more than 89 mass % and has a weight-average molecular weight of not less than $1.0 \times 10^6$ and not more than $2.0 \times 10^7$. On the other hand, a branch polymer that forms a branch part of the same graft copolymer includes a water-soluble monomer unit formed from a water-soluble monomer having a solubility of not less than 0.01 g/100 g-H$_2$O and not more than 25 g/100 g-H$_2$O at a temperature of 20° C. By producing an electrode using the presently disclosed binder composition that contains the graft copolymer including a backbone polymer and a branch polymer such as described above, it is possible to inhibit swelling of the electrode caused by charging and discharging. It is also possible to cause a secondary battery that includes the electrode to display excellent cycle characteristics.

<<Backbone Polymer>>

[Chemical Composition of Backbone Polymer]

The backbone polymer includes a hydroxyl group-containing vinyl monomer unit in a proportion within a specific range and also includes monomer units other than the hydroxyl group-containing vinyl monomer unit (i.e., other monomer units). Although no specific limitations are placed on these other monomer units, an ethylenically unsaturated carboxylic acid monomer unit and a (meth)acrylamide monomer unit are suitable.

—Hydroxyl Group-Containing Vinyl Monomer Unit—

Examples of hydroxyl group-containing vinyl monomers that can form the hydroxyl group-containing vinyl monomer unit include, without any specific limitations, any compound that includes a hydroxyl group (—OH) and a vinyl group (—CH=CH$_2$) or an isopropenyl group (—C(CH$_3$)=CH$_2$). For example, the hydroxyl group-containing vinyl monomer is preferably a monofunctional compound that includes a hydroxyl group and a vinyl group or an isopropenyl group and that includes one ethylenically unsaturated bond (C=C) of a vinyl group or an isopropenyl group per molecule. Examples of hydroxyl group-containing vinyl monomers that can be used include 2-hydroxyethyl acrylate, 2-hydroxyethyl methacrylate, 2-hydroxypropyl acrylate, 2-hydroxypropyl methacrylate, N-hydroxymethylacrylamide (N-methylolacrylamide), N-hydroxymethylmethacrylamide, N-hydroxyethylacrylamide, and N-hydroxyethylmethacrylamide. One of these hydroxyl group-containing vinyl monomers may be used individually, or two or more of these hydroxyl group-containing vinyl monomers may be used in combination in a freely selected ratio.

From a viewpoint of ensuring viscosity stability of a slurry composition and inhibiting spring-back of an obtained electrode while also improving peel strength of the electrode, 2-hydroxyethyl acrylate, 2-hydroxyethyl methacrylate, 2-hydroxypropyl acrylate, 2-hydroxypropyl methacrylate, N-methylolacrylamide, and N-hydroxyethylacrylamide are preferable as the hydroxyl group-containing vinyl monomer, and 2-hydroxyethyl acrylate, 2-hydroxyethyl methacrylate, and N-hydroxyethylacrylamide are more preferable as the hydroxyl group-containing vinyl monomer.

The proportion in which the hydroxyl group-containing vinyl monomer unit is included in the backbone polymer when the total of all monomer units included in the backbone polymer is taken to be 100 mass % is required to be not less than 5 mass % and not more than 89 mass %, is preferably 10 mass % or more, more preferably 15 mass % or more, and even more preferably 25 mass % or more, and is preferably 60 mass % or less, more preferably 40 mass % or less, and even more preferably 35 mass % or less. When the proportion in which the hydroxyl group-containing vinyl monomer unit is included in the backbone polymer is less than 5 mass %, peel strength of an electrode decreases, and cycle characteristics are lost. On the other hand, when the proportion in which the hydroxyl group-containing vinyl monomer unit is included in the backbone polymer is more than 89 mass %, the viscosity of a slurry composition increases excessively, making it necessary to reduce the solid content concentration of the slurry composition in electrode production. Consequently, it is not possible to efficiently produce an electrode that can sufficiently cause a secondary battery to display cell characteristics such as cycle characteristics. Moreover, it may not be possible to inhibit metal deposition on the electrode.

—Ethylenically Unsaturated Carboxylic Acid Monomer Unit—

Ethylenically unsaturated carboxylic acid monomers that can form the ethylenically unsaturated carboxylic acid monomer unit referred to in the present disclosure do not normally include a hydroxyl group (—OH) other than a hydroxyl group present in a carboxyl group thereof.

Examples of ethylenically unsaturated carboxylic acid monomers that can be used include ethylenically unsaturated monocarboxylic acids, derivatives of ethylenically unsaturated monocarboxylic acids, ethylenically unsaturated dicarboxylic acids, acid anhydrides of ethylenically unsaturated dicarboxylic acids, and derivatives of ethylenically unsaturated dicarboxylic acids and acid anhydrides thereof. One ethylenically unsaturated carboxylic acid monomer may be used individually, or two or more ethylenically unsaturated carboxylic acid monomers may be used in combination in a freely selected ratio.

Examples of ethylenically unsaturated monocarboxylic acids include acrylic acid, methacrylic acid, and crotonic acid.

Examples of derivatives of ethylenically unsaturated monocarboxylic acids include 2-ethylacrylic acid, isocrotonic acid, α-acetoxyacrylic acid, β-trans-aryloxyacrylic acid, α-chloro-β-E-methoxyacrylic acid, and β-diaminoacrylic acid.

Examples of ethylenically unsaturated dicarboxylic acids include maleic acid, fumaric acid, and itaconic acid.

Examples of acid anhydrides of ethylenically unsaturated dicarboxylic acids include maleic anhydride, diacrylic anhydride, methylmaleic anhydride, and dimethylmaleic anhydride.

Examples of derivatives of ethylenically unsaturated dicarboxylic acids include methylmaleic acid, phenylmaleic acid, chloromaleic acid, dichloromaleic acid, and fluoromaleic acid.

The ethylenically unsaturated carboxylic acid monomer is preferably a monofunctional ethylenically unsaturated carboxylic acid monomer that includes one ethylenically unsaturated bond (C=C) per molecule. From a viewpoint of polymerizability, ethylenically unsaturated monocarboxylic acids and ethylenically unsaturated dicarboxylic acids are preferable as the ethylenically unsaturated carboxylic acid monomer, acrylic acid, methacrylic acid, and itaconic acid are more preferable as the ethylenically unsaturated carboxylic acid monomer, and acrylic acid and methacrylic acid are even more preferable as the ethylenically unsaturated carboxylic acid monomer. Moreover, acrylic acid is further preferable as the ethylenically unsaturated carboxylic acid monomer from a viewpoint of inhibiting excessive swelling in electrolyte solution of the obtained graft copolymer.

The proportion in which the ethylenically unsaturated carboxylic acid monomer unit is included in the backbone polymer when the total of all monomer units included in the backbone polymer is taken to be 100 mass % is preferably 1 mass % or more, more preferably 5 mass % or more, even more preferably 10 mass % or more, further preferably 26 mass % or more, and particularly preferably 30 mass % or more, and is preferably 50 mass % or less, more preferably 45 mass % or less, even more preferably 40 mass % or less, and particularly preferably 35 mass % or less. When the proportion in which the ethylenically unsaturated carboxylic acid monomer unit is included in the backbone polymer is 1 mass % or more, peel strength of an electrode can be improved. On the other hand, when the proportion in which the ethylenically unsaturated carboxylic acid monomer unit is included in the backbone polymer is 50 mass % or less, spring-back of an electrode can be inhibited.

—(Meth)acrylamide Monomer Unit—

The (meth)acrylamide monomer unit is formed using a (meth)acrylamide monomer that is acrylamide and/or methacrylamide.

The proportion in which the (meth)acrylamide monomer unit is included in the backbone polymer when the total of all monomer units included in the backbone polymer is taken to be 100 mass % is preferably 10 mass % or more, more preferably 15 mass % or more, even more preferably 20 mass % or more, further preferably 30 mass % or more, and particularly preferably 35 mass % or more, and is preferably 60 mass % or less, more preferably 50 mass % or less, and even more preferably 40 mass % or less. When the proportion in which the (meth)acrylamide monomer unit is included in the backbone polymer is 10 mass % or more, dispersibility of an electrode active material in a slurry composition can be increased, and viscosity stability of the slurry composition can be improved. Moreover, by using a slurry composition for which viscosity stability is ensured through the proportion of the (meth)acrylamide monomer unit being 10 mass % or more, electrode swelling associated with repeated charging and discharging can be further inhibited while also further improving cycle characteristics. The peel strength and flexibility of an electrode can also be improved. Furthermore, metal deposition on the electrode can be inhibited. On the other hand, when the proportion in which the (meth)acrylamide monomer unit is included in the backbone polymer is 60 mass % or less, reduction of viscosity of a slurry composition can be inhibited, and viscosity stability of the slurry composition can be improved.

[Properties of Backbone Polymer]

—Weight-Average Molecular Weight—

The weight-average molecular weight of the backbone polymer is required to be not less than $1.0 \times 10^6$ and not more than $2.0 \times 10^7$, is preferably $2.5 \times 10^6$ or more, and more preferably $5.0 \times 10^6$ or more, and is preferably $1.8 \times 10^7$ or less, and more preferably $1.5 \times 10^7$ or less. When the weight-average molecular weight of the backbone polymer is less than $1.0 \times 10^6$, strength of the graft copolymer decreases. Consequently, electrode swelling caused by charging and discharging cannot be inhibited, and cycle characteristics of a secondary battery are lost. Moreover, peel strength of an obtained electrode decreases. On the other hand, when the weight-average molecular weight of the backbone polymer is more than $2.0\times10^7$, the viscosity of a slurry composition increases excessively, making it necessary to reduce the solid content concentration of the slurry composition in electrode production. Consequently, it is not possible to efficiently produce an electrode that can sufficiently cause a secondary battery to display cell characteristics such as cycle characteristics. Moreover, it may not be possible to inhibit metal deposition on the electrode. Furthermore, as a consequence of the graft copolymer being excessively rigid, flexibility of the electrode is lost, and spring-back of the electrode cannot be inhibited.

—Glass-Transition Temperature—

The glass-transition temperature of the backbone polymer is preferably −10° C. or higher, more preferably 50° C. or higher, even more preferably 80° C. or higher, and particularly preferably 90° C. or higher, and is preferably 150° C. or lower, more preferably 145° C. or lower, and even more preferably 140° C. or lower. When the glass-transition temperature of the backbone polymer is −10° C. or higher, the strength of the graft copolymer increases. Consequently, electrode swelling caused by charging and discharging can be further inhibited while also further improving cycle characteristics of a secondary battery. On the other hand, when the glass-transition temperature of the backbone polymer is 150° C. or lower, flexibility of an electrode can be ensured.

<<Branch Polymer>>

The branch polymer that is bonded to the backbone polymer set forth above is required to include a water-soluble monomer unit and may optionally further include monomer units other than the water-soluble monomer unit (i.e., optional monomer units). Moreover, a water-soluble monomer that forms the water-soluble monomer unit included in the branch polymer is required to have a solubility of not less than 0.01 g/100 g-H$_2$O and not more than 25 g/100 g-H$_2$O at a temperature of 20° C. By forming the branch polymer through polymerization of a water-soluble monomer having a solubility (20° C.) in water that is within a specific range in this manner, various characteristics of an obtained slurry composition, electrode, and secondary battery can be improved.

Specifically, the water-soluble monomer used in production of the branch polymer is a monomer that has a solubility (20° C.) in water of 0.01 g/100 g-H$_2$O or more and for which polymerizability in water is ensured. On the other hand, it is presumed that as a result of the aforementioned solubility of the water-soluble monomer being 25 g/100 g-H$_2$O or less, the branch polymer in the graft copolymer is not excessively hydrophilic, and thus the surface of an electrode active material that is hydrophobic can be well coated by the graft copolymer. Good coating of the surface of an electrode active material by the graft copolymer is thought to provide the following effects.

(1) Viscosity stability of a slurry composition is improved through increased dispersibility of the electrode active material in the slurry composition.

(2) Space between the electrode active material and the graft copolymer is ensured and conductivity of charge carriers such as lithium ions is improved as a result of the graft copolymer covering the surface of the electrode active material via the branch polymer. This inhibits metal deposition on an electrode and improves rate characteristics of a secondary battery.

(3) The electrode active material is strongly adhered together in electrolyte solution and detachment of the electrode active material from a current collector is inhibited. This can inhibit electrode swelling after charging and discharging and maintain adequate conduction paths in the electrode even after charging and discharging, and thus can improve cycle characteristics of a secondary battery.

[Water-Soluble Monomer Unit]

Examples of water-soluble monomers that can form the water-soluble monomer unit include, without any specific limitations, any compound that has the solubility (20° C.) in water described above and that includes a group (an ethylenically unsaturated bond, etc.) that is copolymerizable with another monomer.

Examples of water-soluble monomers that can be used include acrylonitrile (7 g/100 g-H$_2$O), n-butyl acrylate (1.4 g/100 g-H$_2$O), styrene (0.28 g/100 g-H$_2$O), ethyl acrylate (1.5 g/100 g-H$_2$O), sodium styrenesulfonate (22.0 g/100 g-H$_2$O), methacrylonitrile (2.57 g/100 g-H$_2$O), and methacrylamide (19.9 g/100 g-H$_2$O). One water-soluble monomer may be used individually, or two or more water-soluble monomers may be used in combination in a freely selected ratio. Of these water-soluble monomers, acrylonitrile and n-butyl acrylate are preferable from a viewpoint of further inhibiting electrode swelling associated with repeated charging and discharging, and also increasing peel strength and flexibility of an electrode and further improving cycle characteristics of a secondary battery, with acrylonitrile being more preferable.

The solubility (20° C.) of the water-soluble monomer in water is required to be not less than 0.01 g/100 g-H$_2$O and not more than 25 g/100 g-H$_2$O as previously described, is preferably 0.1 g/100 g-H$_2$O or more, more preferably 1 g/100 g-H$_2$O or more, and even more preferably 3 g/100 g-H$_2$O or more, and is preferably 20 g/100 g-H$_2$O or less, more preferably 15 g/100 g-H$_2$O or less, and even more preferably 10 g/100 g-H$_2$O or less. When the solubility (20° C.) of the water-soluble monomer in water is less than 0.01 g/100 g-H$_2$O, polymerization in water is difficult. Moreover, electrode swelling associated with repeated charging and discharging cannot be inhibited, and peel strength and flexibility of an electrode decrease. Consequently, cycle characteristics of a secondary battery are lost. On the other hand, when the solubility (20° C.) of the water-soluble monomer in water is more than 25 g/100 g-H$_2$O, the surface of an electrode active material cannot be well coated by the graft copolymer. Consequently, electrode swelling associated with repeated charging and discharging cannot be inhibited, and cycle characteristics are lost. Moreover, the viscosity stability of a slurry composition decreases, metal deposition on an electrode cannot be inhibited, and rate characteristics of a secondary battery are lost.

The proportion in which the water-soluble monomer unit is included in the branch polymer when the total of all monomer units included in the branch polymer is taken to be 100 mass % is preferably 80 mass % or more, more preferably 90 mass % or more, even more preferably 95 mass % or more, particularly preferably 99 mass % or more, and most preferably 100 mass % (i.e., the branch polymer is most preferably composed of only the water-soluble monomer unit). When the proportion in which the water-soluble monomer unit is included in the branch polymer is 80 mass % or more, the surface of an electrode active material can be sufficiently well coated by the graft copolymer. Consequently, electrode swelling associated with repeated charging and discharging can be further inhibited while also further improving cycle characteristics. Moreover, the viscosity stability of a slurry composition can be increased.

Furthermore, metal deposition on an electrode can be inhibited, and rate characteristics of a secondary battery can be improved.

[Optional Monomer Units]

Examples of monomers other than the water-soluble monomer that can be used in production of the branch polymer include, without any specific limitations, any monomer that is copolymerizable with the water-soluble monomer. The proportion in which optional monomer units are included in the branch polymer when the total of all monomer units included in the branch polymer is taken to be 100 mass % is preferably 20 mass % or less, more preferably 10 mass % or less, even more preferably 5 mass % or less, particularly preferably 1 mass % or less, and most preferably 0 mass %.

<<Production Method of Graft Copolymer>>

The method of production of the graft copolymer having a structure in which the branch polymer set forth above is bonded to the backbone polymer set forth above is not specifically limited and may, for example, be either of the following methods (1) or (2).

(1) A method in which a monomer composition for a backbone polymer containing at least a hydroxyl group-containing vinyl monomer is polymerized to produce a backbone polymer and then a monomer composition for a branch polymer containing at least a water-soluble monomer is graft polymerized with respect to the obtained backbone polymer (2) A method in which a monomer composition for a backbone polymer containing at least a hydroxyl group-containing vinyl monomer is polymerized to produce a backbone polymer and then a branch polymer including a water-soluble monomer unit that has been separately produced is caused to bond to the obtained backbone polymer It should be noted that the proportion in which each monomer is included among all monomers in a monomer composition (monomer composition for backbone polymer or monomer composition for branch polymer) is normally the same as the proportion in which that monomer is included in the target polymer (backbone polymer or branch polymer).

Moreover, known methods can be adopted without any specific limitations as the method by which the backbone polymer is produced, the method by which the monomer composition for a branch polymer is graft polymerized with respect to the backbone polymer, the method by which the branch polymer is produced, and the method by which the branch polymer is caused to bond to the backbone polymer. For example, the polymerization method may be any of solution polymerization, suspension polymerization, bulk polymerization, and emulsion polymerization without any specific limitations. Moreover, ionic polymerization, radical polymerization, living radical polymerization, or the like may be adopted as the polymerization reaction. A known polymerization accelerator and/or polymerization initiator can be used in polymerization as necessary. The reaction solvent is preferably water.

<<Properties of Graft Copolymer>>

[Grafting Ratio]

The grafting ratio of the graft copolymer obtained as described above is preferably 0.5 mass % or more, more preferably 1.0 mass % or more, even more preferably 2.0 mass % or more, and particularly preferably 3.0 mass % or more, and is preferably 200 mass % or less, more preferably 100 mass % or less, even more preferably 20 mass % or less, particularly preferably 10 mass % or less, and most preferably less than 10 mass %. When the grafting ratio of the graft copolymer is 0.5 mass % or more, flexibility of an electrode can be ensured through plasticization of the overall graft copolymer as a result of the branch polymer being present, and peel strength of the electrode can be improved. Moreover, the surface of an electrode active material can be sufficiently well coated by the graft copolymer, and thus electrode swelling associated with repeated charging and discharging can be further inhibited while also further improving cycle characteristics. Metal deposition on the electrode can also be inhibited. On the other hand, when the grafting ratio of the graft copolymer is 200 mass % or less, the graft copolymer does not excessively swell in electrolyte solution, and electrode swelling associated with repeated charging and discharging can be further inhibited while also sufficiently ensuring cycle characteristics of a secondary battery. Moreover, when the grafting ratio of the graft copolymer is 200 mass % or less, disadvantageous effects of the proportion constituted by the branch polymer in the graft copolymer being excessively high can be avoided. For example, in a case in which the branch polymer is produced using acrylonitrile as the water-soluble monomer, an excessive increase in the proportion constituted by the branch polymer in the graft copolymer may have disadvantageous effects such as reduction of flexibility and peel strength of an electrode and inability to sufficiently inhibit spring-back of the electrode and metal deposition on the electrode. However, when the grafting ratio is 200 mass % or less as described above, these disadvantageous effects do not excessively occur.

[Degree of Swelling in Electrolyte Solution]

The degree of swelling in electrolyte solution of the graft copolymer is preferably more than a factor of 1, and is preferably a factor of 2 or less, more preferably a factor of 1.5 or less, and even more preferably a factor of 1.3 or less. When the degree of swelling in electrolyte solution of the graft copolymer is within any of the ranges set forth above, electrode swelling associated with repeated charging and discharging can be further inhibited while also sufficiently ensuring cycle characteristics of a secondary battery. Note that the degree of swelling in electrolyte solution of the graft copolymer can be adjusted by altering the types of monomers used in production of the backbone polymer and the branch polymer and by altering the grafting ratio of the graft copolymer.

[Solubility (20° C.) in Water]

The solubility of the graft copolymer is preferably 1 g/100 g-$H_2O$ or more at a temperature of 20° C. In other words, the graft copolymer is preferably water-soluble. When the solubility (20° C.) of the graft copolymer in water is 1 g/100 g-$H_2O$ or more, the surface of an electrode active material can be sufficiently well coated by the graft copolymer. Consequently, electrode swelling associated with repeated charging and discharging can be further inhibited while also further improving cycle characteristics. The viscosity stability of a slurry composition can also be increased. Moreover, metal deposition on an electrode can be inhibited, and rate characteristics of a secondary battery can be improved.

<Particulate Polymer>

The particulate polymer that can optionally be contained in the presently disclosed binder composition is a different polymer to the specific graft copolymer set forth above. As previously described, the particulate polymer is normally water-insoluble. Accordingly, the particulate polymer normally has a particulate form in an aqueous binder composition or an aqueous slurry composition that contains water as a solvent or a dispersion medium. Moreover, the particulate polymer may maintain a particulate form in an electrode mixed material layer or may have any non-particulate form in an electrode mixed material layer.

By using a binder composition that further contains a particulate polymer in addition to the graft copolymer, peel strength and flexibility of an electrode can be increased, and cycle characteristics of a secondary battery can be further improved.

The particulate polymer preferably includes either or both of a carboxyl group and a hydroxyl group. Moreover, the particulate polymer preferably includes both a carboxyl group and a hydroxyl group.

Any polymer such as a conjugated diene polymer, an acrylic polymer, an unsaturated carboxylic acid polymer, or the like can be used as the particulate polymer without any specific limitations.

<<Conjugated Diene Polymer>>

The conjugated diene polymer is a polymer that includes a conjugated diene monomer unit. Specific examples of the conjugated diene polymer include, but are not specifically limited to, a copolymer including an aromatic vinyl monomer unit and an aliphatic conjugated diene monomer unit, such as a styrene-butadiene copolymer (SBR), butadiene rubber (BR), isoprene rubber, acrylic rubber (NBR) (copolymer including an acrylonitrile unit and a butadiene unit), and hydrogenated products thereof.

A copolymer that includes a carboxyl group and/or a hydroxyl group and that includes an aromatic vinyl monomer unit and an aliphatic conjugated diene monomer unit, for example, can be obtained through polymerization, by any method, of an aromatic vinyl monomer that can form an aromatic vinyl monomer unit, an aliphatic conjugated diene monomer that can form an aliphatic conjugated diene monomer unit, and a carboxyl group-containing monomer and/or hydroxyl group-containing monomer. Moreover, other monomers may optionally be further used in production of the copolymer.

[Aromatic Vinyl Monomer]

Examples of aromatic vinyl monomers that can be used include styrene, α-methylstyrene, vinyltoluene, and divinylbenzene. One of these aromatic vinyl monomers may be used individually, or two or more of these aromatic vinyl monomers may be used in combination. Of these aromatic vinyl monomers, styrene is preferable.

[Aliphatic Conjugated Diene Monomer]

Examples of aliphatic conjugated diene monomers that can be used include 1,3-butadiene, 2-methyl-1,3-butadiene, 2,3-dimethyl-1,3-butadiene, 2-chloro-1,3-butadiene, substituted linear conjugated pentadienes, and substituted and branched conjugated hexadienes. One of these aliphatic conjugated diene monomers may be used individually, or two or more of these aliphatic conjugated diene monomers may be used in combination. Of these aliphatic conjugated diene monomers, 1,3-butadiene is preferable.

[Carboxyl Group-Containing Monomer]

Examples of carboxyl group-containing monomers that can be used include the same monomers as for the previously described "ethylenically unsaturated carboxylic acid monomer" in the "Graft copolymer" section. One of these carboxyl group-containing monomers may be used individually, or two or more of these carboxyl group-containing monomers may be used in combination. Of these carboxyl group-containing monomers, itaconic acid is preferable.

[Hydroxyl Group-Containing Monomer]

Examples of hydroxyl group-containing monomers that can be used in production of the copolymer including an aromatic vinyl monomer unit and an aliphatic conjugated diene monomer unit include the same monomers as for the "hydroxyl group-containing vinyl monomer" previously described in the "Graft copolymer" section. One of these hydroxyl group-containing monomers may be used individually, or two or more of these hydroxyl group-containing monomers may be used in combination. Of these hydroxyl group-containing monomers, 2-hydroxyethyl acrylate is preferable.

[Other Monomers]

Examples of other monomers that can be used in production of the copolymer including an aromatic vinyl monomer unit and an aliphatic conjugated diene monomer unit include monomers that are copolymerizable with the monomers described above. Specific examples of such other monomers include fluorine-containing monomers such as fluorine-containing (meth)acrylic acid ester monomers; sulfuric acid ester group-containing monomers such as acrylamido-2-methylpropane sulfonic acid; amide group-containing monomers such as acrylamide and methacrylamide; cross-linking monomers (cross-linkable monomers) such as allyl glycidyl ether and allyl (meth)acrylate; olefins such as ethylene and propylene; halogen atom-containing monomers such as vinyl chloride and vinylidene chloride; vinyl esters such as vinyl acetate, vinyl propionate, vinyl butyrate, and vinyl benzoate; vinyl ethers such as methyl vinyl ether, ethyl vinyl ether, and butyl vinyl ether; vinyl ketones such as methyl vinyl ketone, ethyl vinyl ketone, butyl vinyl ketone, hexyl vinyl ketone, and isopropenyl vinyl ketone; heterocycle-containing vinyl compounds such as N-vinylpyrrolidone, vinylpyridine, and vinylimidazole; amino group-containing monomers such as aminoethyl vinyl ether and dimethylaminoethyl vinyl ether; and α,β-unsaturated nitrile monomers such as acrylonitrile and methacrylonitrile. One of these other monomers may be used individually, or two or more of these other monomers may be used in combination.

Note that in the present disclosure, "(meth)acrylate" is used to indicate "acrylate" and/or "methacrylate".

Also note that in a case in which a (meth)acrylic acid ester monomer is used in production of a conjugated diene polymer, such as a copolymer including an aromatic vinyl monomer unit and an aliphatic conjugated diene monomer unit, the proportion in which the (meth)acrylic acid ester monomer is included is less than 50 mass % per 100 mass % of all monomers forming the conjugated diene polymer.

<<Acrylic Polymer>>

The acrylic polymer is a polymer that includes a (meth)acrylic acid ester monomer unit.

An acrylic polymer that includes a carboxyl group and/or a hydroxyl group, for example, can be obtained through polymerization, by any method, of a (meth)acrylic acid ester monomer that can form a (meth)acrylic acid ester monomer unit and a carboxyl group-containing monomer and/or hydroxyl group-containing monomer. Moreover, other monomers may optionally be further used in production of the acrylic polymer.

Note that the acrylic polymer normally includes 50 mass % or more of the (meth)acrylic acid ester monomer per 100 mass % of all monomers forming the acrylic polymer and differs from the previously described conjugated diene polymer.

[(Meth)acrylic Acid Ester Monomer]

Examples of (meth)acrylic acid ester monomers that can be used include acrylic acid alkyl esters such as methyl acrylate, ethyl acrylate, n-propyl acrylate, isopropyl acrylate, n-butyl acrylate, t-butyl acrylate, pentyl acrylate, hexyl acrylate, heptyl acrylate, and octyl acrylate (2-ethylhexyl acrylate, etc.); and methacrylic acid alkyl esters such as methyl methacrylate, ethyl methacrylate, n-propyl methacrylate, isopropyl methacrylate, n-butyl methacrylate, t-butyl methacrylate, pentyl methacrylate, hexyl methacrylate, heptyl methacrylate, and octyl methacrylate (2-ethylhexyl methacrylate, etc.). One of these (meth)acrylic acid ester monomers may be used individually, or two or more of these (meth)acrylic acid ester monomers may be used in combination. Of these (meth)acrylic acid ester monomers, n-butyl acrylate is preferable.

[Carboxyl Group-Containing Monomer]

Examples of carboxyl group-containing monomers that can be used in production of the acrylic polymer include the same monomers as for the previously described "ethylenically unsaturated carboxylic acid monomer" in the "Graft copolymer" section. One of these carboxyl group-containing monomers may be used individually, or two or more of these carboxyl group-containing monomers may be used in combination. Of these carboxyl group-containing monomers, methacrylic acid is preferable.

[Hydroxyl Group-Containing Monomer]

Examples of hydroxyl group-containing monomers that can be used in production of the acrylic polymer include the same monomers as for the previously described "hydroxyl group-containing vinyl monomer". One of these hydroxyl group-containing monomers may be used individually, or two or more of these hydroxyl group-containing monomers may be used in combination. Of these hydroxyl group-containing monomers, N-methylolacrylamide is preferable.

[Other Monomers]

Examples of other monomers that can be used in production of the acrylic polymer include monomers that are copolymerizable with the monomers described above. Specific examples of such other monomers include α,β-unsaturated nitrile monomers such as acrylonitrile and methacrylonitrile; sulfuric acid ester group-containing monomers such as acrylamido-2-methylpropane sulfonic acid; amide group-containing monomers such as acrylamide and methacrylamide; cross-linking monomers (cross-linkable monomers) such as allyl glycidyl ether and allyl (meth)acrylate; styrenic monomers such as styrene, chlorostyrene, vinyltoluene, t-butyl styrene, methyl vinylbenzoate, vinylnaphthalene, chloromethylstyrene, α-methylstyrene, and divinylbenzene; olefins such as ethylene and propylene; diene monomers such as butadiene and isoprene; halogen atom-containing monomers such as vinyl chloride and vinylidene chloride; vinyl esters such as vinyl acetate, vinyl propionate, vinyl butyrate, and vinyl benzoate; vinyl ethers such as methyl vinyl ether, ethyl vinyl ether, and butyl vinyl ether; vinyl ketones such as methyl vinyl ketone, ethyl vinyl ketone, butyl vinyl ketone, hexyl vinyl ketone, and isopropenyl vinyl ketone; heterocycle-containing vinyl compounds such as N-vinylpyrrolidone, vinylpyridine, and vinylimidazole; and amino group-containing monomers such as aminoethyl vinyl ether and dimethylaminoethyl vinyl ether. One of these other monomers may be used individually, or two or more of these other monomers may be used in combination.

<<Unsaturated Carboxylic Acid Polymer>>

The unsaturated carboxylic acid polymer is a polymer that includes an unsaturated carboxylic acid monomer unit. Examples of unsaturated carboxylic acid monomers that can form the unsaturated carboxylic acid monomer unit include acrylic acid, methacrylic acid, and itaconic acid.

<<Production Method of Particulate Polymer>>

Any of solution polymerization, suspension polymerization, bulk polymerization, emulsion polymerization, or the like may be adopted as the polymerization method of the particulate polymer without any specific limitations. Moreover, the polymerization reaction can be addition polymerization such as ionic polymerization, radical polymerization, or living radical polymerization. Polymerization solvents, emulsifiers, dispersants, polymerization initiators, chain transfer agents, and so forth that can be used in polymerization can be the same as typically used, and the amounts thereof can also be the same as typically used.

<<Content of Particulate Polymer>>

In a case in which the presently disclosed binder composition contains a particulate polymer, the content ratio of the graft copolymer and the particulate polymer is preferably as follows. Specifically, the content of the graft copolymer relative to 100 parts by mass of the particulate polymer is preferably 0.1 parts by mass or more, more preferably 1 part by mass or more, even more preferably 10 parts by mass or more, and particularly preferably 20 parts by mass or more, and is preferably 200 parts by mass or less, more preferably 150 parts by mass or less, and even more preferably 120 parts by mass or less. When the content ratio of the graft copolymer and the particulate polymer in the binder composition is within any of the ranges set forth above, productivity of a slurry composition and an electrode obtained using the slurry composition can be ensured.

<Other Components>

Besides the components described above, the presently disclosed binder composition may contain any other components such as reinforcing materials, leveling agents, viscosity modifiers, and additives for electrolyte solution. These other components can be commonly known components, such as components described in WO2012/115096A1, without any specific limitations so long as they do not affect battery reactions. One of these components may be used individually, or two or more of these components may be used in combination in a freely selected ratio.

Note that the presently disclosed binder composition can contain a polymer other than the previously described graft copolymer and particulate polymer. Specifically, the binder composition may contain a water-soluble polymer other than the previously described graft copolymer.

Examples of water-soluble polymers that can be used include natural polymers, semi-synthetic polymers, and synthetic polymers. More specifically, the water-soluble polymer may be a natural polymer such as a thickening polysaccharide, alginic acid, a salt of a thickening polysaccharide or alginic acid (for example, sodium alginate), or starch; a semi-synthetic polymer obtained through chemical treatment of a natural polymer serving as a starting material such as carboxymethyl cellulose or a salt thereof; or a synthetic polymer such as polyvinyl pyrrolidone or polyacrylic acid (cross-linked polyacrylic acid or non-cross-linked polyacrylic acid), for example. Of these examples, semi-synthetic polymers and synthetic polymers are preferable as the water-soluble polymer from a viewpoint of increasing viscosity stability of a slurry composition, a viewpoint of dispersing components such as an electrode active material well in a slurry composition, a viewpoint of increasing peel strength of an electrode, and a viewpoint of inhibiting metal deposition on an electrode, with carboxymethyl cellulose, a salt of carboxymethyl cellulose, and polyacrylic acid being more preferable as the water-soluble polymer.

<Solvent>

Examples of solvents that can be used in production of the presently disclosed binder composition include known solvents in which the previously described graft copolymer and the optionally used particulate polymer and water-soluble polymer can be dissolved or dispersed. In particular, water is preferably used as the solvent. Note that at least part of the solvent of the binder composition can, without any specific limitations, be a polymerization solvent that was used in production of the graft copolymer, the particulate polymer, and/or the water-soluble polymer.

<Production Method of Binder Composition>

The presently disclosed binder composition can be produced by, for example, mixing the graft copolymer and the optionally used particulate polymer and other components in the solvent by a known method. Specifically, the binder composition can be produced by mixing the above-described components using a mixer such as a ball mill, a sand mill, a bead mill, a pigment disperser, a grinding machine, an ultrasonic disperser, a homogenizer, a planetary mixer, or a FILMIX.

Note that in a case in which the graft copolymer and the optionally used particulate polymer and water-soluble polymer are produced through polymerization in an aqueous solvent, the graft copolymer, the particulate polymer, and the water-soluble polymer can each be mixed as obtained as an aqueous solution or water dispersion so as to produce a binder composition containing water as a solvent.

Moreover, production of the binder composition and production of the subsequently described slurry composition may be performed at the same time by, for example, mixing the graft copolymer with an electrode active material and subsequently adding the optionally used particulate polymer and/or water-soluble polymer.

(Slurry Composition for Non-Aqueous Secondary Battery Electrode)

A feature of the presently disclosed slurry composition is that it contains an electrode active material and the binder composition set forth above. The presently disclosed slurry composition may further contain other components besides the electrode active material and the binder composition. By forming an electrode using a slurry composition that contains the binder composition set forth above, electrode swelling associated with repeated charging and discharging can be inhibited while also causing a secondary battery that includes the electrode to display excellent cycle characteristics.

Although the following provides a detailed description of a case in which the presently disclosed slurry composition for a non-aqueous secondary battery electrode is a slurry composition for a lithium ion secondary battery negative electrode, the presently disclosed slurry composition for a non-aqueous secondary battery electrode is not limited to the following example.

<Electrode Active Material (Negative Electrode Active Material)>

The negative electrode active material of a lithium ion secondary battery is normally a material that can occlude and release lithium. The material that can occlude and release lithium may be a carbon-based negative electrode active material, a non-carbon-based negative electrode active material, an active material that is a combination thereof, or the like, for example.

<<Carbon-Based Negative Electrode Active Material>>

The carbon-based negative electrode active material can be defined as an active material that contains carbon as its main framework and into which lithium can be inserted (also referred to as "doping"). Examples of the carbon-based negative electrode active material include carbonaceous materials and graphitic materials.

A carbonaceous material is a material with a low degree of graphitization (i.e., low crystallinity) that can be obtained by carbonizing a carbon precursor by heat treatment at 2000° C. or lower. The lower limit of the heat treatment temperature in the carbonization is not specifically limited and may for example be 500° C. or higher. Examples of carbonaceous materials include graphitizing carbon whose carbon structure can easily be changed according to the heat treatment temperature and non-graphitizing carbon having a structure similar to an amorphous structure, which is typified by glassy carbon.

The graphitizing carbon may be a carbon material made using tar pitch obtained from petroleum or coal as a raw material. Specific examples include coke, meso-carbon microbeads (MCMB), mesophase pitch-based carbon fiber, and pyrolytic vapor-grown carbon fiber.

Examples of the non-graphitizing carbon include pyrolyzed phenolic resin, polyacrylonitrile-based carbon fiber, quasi-isotropic carbon, pyrolyzed furfuryl alcohol resin (PFA), and hard carbon.

The graphitic material is a material having high crystallinity of a similar level to graphite. The graphitic material can be obtained by heat-treating graphitizing carbon at 2000° C. or higher. The upper limit of the heat treatment temperature is not specifically limited and may for example be 5000° C. or lower. Examples of the graphitic material include natural graphite and artificial graphite.

Examples of the artificial graphite include artificial graphite obtained by heat-treating carbon containing graphitizing carbon mainly at 2800° C. or higher, graphitized MCMB obtained by heat-treating MCMB at 2000° C. or higher, and graphitized mesophase pitch-based carbon fiber obtained by heat-treating mesophase pitch-based carbon fiber at 2000° C. or higher.

Furthermore, natural graphite that is at least partially surface coated with amorphous carbon (amorphous-coated natural graphite) may be used as the carbon-based negative electrode active material.

<<Non-Carbon-Based Negative Electrode Active Material>>

The non-carbon-based negative electrode active material is an active material that is not a carbon-based negative electrode active material composed only of a carbonaceous material or a graphitic material. Examples of the non-carbon-based negative electrode active material include a metal-based negative electrode active material.

The metal-based negative electrode active material is an active material that contains metal, the structure of which usually contains an element that allows insertion of lithium, and that has a theoretical electric capacity per unit mass of 500 mAh/g or more when lithium is inserted. Examples of the metal-based negative electrode active material include lithium metal; a simple substance of metal that can form a lithium alloy (for example, Ag, Al, Ba, Bi, Cu, Ga, Ge, In, Ni, P, Pb, Sb, Si, Sn, Sr, Zn, or Ti); alloys of the simple substance of metal; and oxides, sulfides, nitrides, silicides, carbides, and phosphides of lithium metal, the simple substance of metal, and the alloys of the simple substance of metal. Of these examples, an active material containing silicon (silicon-based negative electrode active material) is preferable as the metal-based negative electrode active material. One reason for this is that the capacity of a lithium ion secondary battery can be increased through use of a silicon-based negative electrode active material.

Examples of silicon-based negative electrode active materials include silicon (Si), a silicon-containing alloy, SiO, $SiO_x$, and a composite of conductive carbon and a Si-containing material obtained by coating or combining the Si-containing material with the conductive carbon. Note that one of these silicon-based negative electrode active materials may be used individually, or two or more of these silicon-based negative electrode active materials may be used in combination.

From a viewpoint of increasing lithium ion secondary battery capacity, a silicon-containing alloy and $SiO_x$ are preferable as the silicon-based negative electrode active material.

The silicon-containing alloy may, for example, be an alloy composition that contains silicon and at least one element selected from the group consisting of titanium, iron, cobalt, nickel, and copper. Alternatively, the silicon-containing alloy may, for example, be an alloy composition that contains silicon, aluminum, and transition metals such as iron, and further contains rare-earth elements such as tin and yttrium.

<Dispersion Medium>

The dispersion medium of the slurry composition for a lithium ion secondary battery negative electrode can, without any specific limitations, be a known dispersion medium such as water or N-methylpyrrolidone, for example. Of these examples, water is preferable as the dispersion medium.

Note that at least part of the dispersion medium of the slurry composition can, without any specific limitations, be a solvent that was contained in the binder composition used in production of the slurry composition.

<Other Components>

The slurry composition for a lithium ion secondary battery negative electrode may further contain other components in addition to the components described above. Examples of other components that can be contained in the slurry composition include conductive materials and the same components as other components that can be contained in the binder composition set forth above.

<Production Method of Slurry Composition>

The slurry composition for a lithium ion secondary battery negative electrode can be produced by dispersing the above-described components in the dispersion medium. Specifically, the slurry composition can be produced by mixing the above-described components and the dispersion medium using a mixer such as a ball mill, a sand mill, a bead mill, a pigment disperser, a grinding machine, an ultrasonic disperser, a homogenizer, a planetary mixer, or a FILMIX.

Although water is normally used as the dispersion medium, an aqueous solution of any compound or a mixed solution of water and a small amount of an organic medium may alternatively be used.

The proportion in which each component is contained in the slurry composition can be adjusted as appropriate.

For example, the ratio in which the electrode active material and the graft copolymer are present in the slurry composition (electrode active material:graft copolymer), in terms of solid content, is preferably 90:10 to 99.5:0.5, and more preferably 95:5 to 99:1 (mass ratio).

(Electrode for Non-Aqueous Secondary Battery)

The presently disclosed electrode includes an electrode mixed material layer formed using the presently disclosed slurry composition set forth above and normally has a structure in which the electrode mixed material layer is formed on a current collector. The electrode mixed material layer contains at least an electrode active material and the specific graft copolymer. Note that components contained in the electrode mixed material layer, such as the electrode active material and the graft copolymer, are components that were contained in the slurry composition set forth above. Moreover, the preferred ratio of these components in the electrode mixed material layer is also the same as the preferred ratio of these components in the binder composition and/or in the slurry composition.

As a result of the presently disclosed electrode including an electrode mixed material layer that is formed using a slurry composition containing the presently disclosed binder composition, swelling of the electrode associated with repeated charging and discharging is inhibited, and the electrode can cause a secondary battery to display excellent cycle characteristics.

<Current Collector>

The current collector is a material having electrical conductivity and electrochemical durability. Specifically, the current collector may, for example, be made of a metal material such as iron, copper, aluminum, nickel, stainless steel, titanium, tantalum, gold, or platinum. One of these materials may be used individually, or two or more of these materials may be used in combination in a freely selected ratio.

<Electrode Mixed Material Layer>

The electrode mixed material layer is formed, for example, through a step of applying the slurry composition onto the current collector (application step) and a step of drying the slurry composition that has been applied onto the current collector (drying step).

<<Application Step>>

The slurry composition can be applied onto the current collector by any commonly known method without any specific limitations. Specific examples of application methods that can be used include doctor blading, dip coating, reverse roll coating, direct roll coating, gravure coating, extrusion coating, and brush coating. During application, the slurry composition may be applied onto one side or both sides of the current collector. The thickness of the slurry composition coating on the current collector after application but before drying may be set as appropriate in accordance with the thickness of the electrode mixed material layer to be obtained after drying.

In the present disclosure, it is presumed that as a result of the graft copolymer being plasticized through the presence of the branch polymer, the flexibility of an obtained electrode is ensured even in a situation in which the electrode mixed material layer is formed by applying a comparatively large amount of the slurry composition onto the current collector (for example, such that the mass per unit area of an electrode mixed material layer (particularly a negative electrode mixed material layer) formed on (at one side of) the current collector is 10.0 mg/cm$^2$ or more). Although no specific limitations are placed on the upper limit of the mass per unit area of the electrode mixed material layer, the mass per unit area of the electrode mixed material layer is normally 16.0 mg/cm$^2$ or less.

<<Drying Step>>

The method by which the slurry composition that has been applied onto the current collector is dried is not specifically limited and may be a commonly known method. Examples of drying methods that can be used include drying by warm, hot, or low-humidity air; drying in a vacuum; and drying by irradiation with infrared light, electron beams, or the like. Drying of the slurry composition that has been applied onto the current collector in this manner forms an electrode mixed material layer on the current collector and thereby provides an electrode that includes the current collector and the electrode mixed material layer.

After the drying step, the electrode mixed material layer may be further subjected to a pressing process, such as mold pressing or roll pressing. The pressing process can improve peel strength of the electrode.

By forming the electrode mixed material layer from the presently disclosed slurry composition containing the specific graft polymer, spring-back of the electrode mixed material layer tends not to occur even after the electrode mixed material layer is subjected to a pressing process. This is presumed to be a result of the graft copolymer being plasticized through the presence of the branch polymer. Therefore, a high-density electrode can be produced.

(Non-Aqueous Secondary Battery)

The presently disclosed secondary battery includes the presently disclosed electrode set forth above. For example, the presently disclosed secondary battery includes a positive electrode, a negative electrode, a separator, and an electrolyte solution, and at least one of the positive electrode and the negative electrode is the presently disclosed electrode set forth above. In other words, the positive electrode of the presently disclosed secondary battery may be the presently disclosed electrode and the negative electrode of the presently disclosed secondary battery may be a known negative electrode. Alternatively, the negative electrode of the presently disclosed secondary battery may be the presently disclosed electrode and the positive electrode of the presently disclosed secondary battery may be a known negative electrode. Further alternatively, the positive electrode and the negative electrode of the presently disclosed secondary battery may each be the presently disclosed electrode.

The presently disclosed secondary battery has excellent cycle characteristics as a result of including the presently disclosed electrode.

Although the following describes, as one example, a case in which the non-aqueous secondary battery is a lithium ion secondary battery, the presently disclosed non-aqueous secondary battery is not limited to the following example.

<Positive Electrode>

The positive electrode is not specifically limited and can be the presently disclosed electrode set forth above. In other words, the positive electrode can include a positive electrode mixed material layer formed from the presently disclosed slurry composition and a current collector, for example.

Moreover, in a case in which the positive electrode is not the presently disclosed electrode, the positive electrode can be a known positive electrode such as a positive electrode formed of a thin sheet of metal or a positive electrode including a current collector and a positive electrode mixed material layer formed on the current collector. The positive electrode mixed material layer normally contains a positive electrode active material, a conductive material, and a binder, and can optionally further contain other components such as a thickener. The current collector can be a thin film formed of a metal material such as aluminum. The positive electrode active material, the conductive material, the binder, and the method by which the positive electrode mixed material layer is formed on the current collector can be any of those described in JP2013-145763A, for example.

<Negative Electrode>

The negative electrode is not specifically limited and can be the presently disclosed electrode set forth above. In other words, the negative electrode can include a negative electrode mixed material layer formed from the presently disclosed slurry composition and a current collector, for example.

Moreover, in a case in which the negative electrode is not the presently disclosed electrode, the negative electrode may be a known negative electrode. Examples of known negative electrodes that can be used include a negative electrode such as described in JP2013-145763A, for example.

<Separator>

Examples of separators that can be used include, but are not specifically limited to, a microporous membrane in which a polyolefinic (polyethylene, polypropylene, polybutene, or polyvinyl chloride) resin is used, a microporous membrane in which a resin of polyethylene terephthalate, polycycloolefin, polyether sulfone, polyamide, polyimide, polyimide-amide, polyaramid, polycycloolefin, nylon, polytetrafluoroethylene, or the like is used, a woven fabric or non-woven fabric in which polyolefinic fiber is used, and an assembly of particles formed of an electrically insulating material. Of these separators, a microporous membrane in which polyolefinic (polyethylene, polypropylene, polybutene, or polyvinyl chloride) resin is used is preferable in terms that the thickness of the overall separator can be reduced, and thus the ratio of an electrode mixed material layer in the secondary battery can be increased and the volumetric capacity of the secondary battery can be increased. In particular, a fine porous membrane formed of polypropylene resin is more preferable.

<Electrolyte Solution>

The electrolyte solution may be formed by dissolving an electrolyte in a solvent.

The solvent may be an organic solvent that can dissolve an electrolyte. Specific examples of suitable solvents include carbonates such as dimethyl carbonate (DMC), ethylene carbonate (EC), diethyl carbonate (DEC), propylene carbonate (PC), butylene carbonate (BC), and ethyl methyl carbonate (EMC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixture of such solvents may be used. Known additives such as vinylene carbonate (VC), fluoroethylene carbonate (FEC), and ethyl methyl sulfone may be added to the solvent.

The electrolyte may be a lithium salt. Examples of lithium salts that can be used include compounds described in JP2012-204303A. Of these lithium salts, $LiPF_6$, $LiClO_4$, and $CF_3SO_3Li$ are preferred as electrolytes because they readily dissolve in organic solvents and exhibit a high degree of dissociation. One electrolyte may be used individually, or two or more electrolytes may be used in combination in a freely selected ratio. In general, lithium ion conductivity tends to increase when a supporting electrolyte having a high degree of dissociation is used. Therefore, lithium ion conductivity can be adjusted through the type of supporting electrolyte that is used.

<Assembly>

The presently disclosed secondary battery can be produced by a known assembly method without any specific limitations. Specifically, the presently disclosed secondary battery can be produced by, for example, performing rolling, folding, or the like of the negative electrode, positive electrode, and separator obtained as described above, as necessary in accordance with the battery shape, to place these battery members in a battery container, injecting the electrolyte solution into the battery container, and sealing the battery container. In order to prevent pressure increase inside the secondary battery and occurrence of overcharging or overdischarging, an overcurrent preventing device such as a fuse or a PTC device; an expanded metal; or a lead plate may be provided as necessary. The shape of the secondary battery may be a coin type, button type, sheet type, cylinder type, prismatic type, flat type, or the like, for example.

Note that the battery members of the secondary battery, such as the positive electrode, the negative electrode, and the separator, are normally arranged such that the positive electrode is in contact with one side of the separator and the negative electrode is in contact with the other side of the separator. More specifically, the battery members are arranged with the positive electrode mixed material layer at one side of the separator and the negative electrode mixed material layer at the other side of the separator and with each of these electrode mixed material layers in contact with the separator.

EXAMPLES

The following provides a more specific description of the present disclosure based on examples. However, the present disclosure is not limited to the following examples. In the following description, "%" and "parts" used in expressing quantities are by mass, unless otherwise specified.

Moreover, the following methods were used to measure and evaluate the weight-average molecular weight and glass-transition temperature of a backbone polymer; the degree of swelling in electrolyte solution, solubility (20° C.) in water, and grafting ratio of a graft copolymer; the viscosity stability of a slurry composition; the inhibition of spring-back, peel strength, inhibition of surface lithium deposition, inhibition of swelling, and flexibility of a negative electrode; and the cycle characteristics of a secondary battery.

<Weight-Average Molecular Weight>

An aqueous solution containing a backbone polymer was diluted to 0.05 mass % with the following eluent to obtain a measurement sample. The obtained measurement sample was analyzed by gel permeation chromatography (GPC) under the following conditions to determine the weight-average molecular weight of the backbone polymer.

Detector: "HLC-8020" produced by Tosoh Corporation
Separation column: "Shodex OHpak SB-G, Shodex OHpak SB-807HQ, SB-806M HQ" (temperature 40° C.) produced by Showa Denko K.K.
Eluent: 0.1 mol/L Tris buffer solution (pH 9; 0.1 M potassium chloride added)
Flow rate: 0.5 mL/min
Standard substance: Standard pullulan <Glass-Transition Temperature>

An aqueous solution containing a backbone polymer was dried in an environment having a relative humidity of 50% and a temperature of 23° C. to 26° C. for 3 days to form a film of 1±0.3 mm in thickness. The formed film was dried in a vacuum dryer at a temperature 60° C. for 10 hours. Thereafter, the dried film was used as a sample to measure the glass-transition temperature (° C.) in accordance with JIS K7121 under conditions of a measurement temperature of −100° C. to 180° C. and a heating rate of 5° C./min using a differential scanning calorimeter (DSC6220 produced by SII Nanotechnology Inc.).

<Degree of Swelling in Electrolyte Solution>

Removal (dialysis) of low molecular weight components such as unreacted monomer and homopolymer produced in graft polymerization from 50 g of an aqueous solution containing a graft copolymer was performed using a Spectra/Por 6 dialysis membrane (produced by Spectrum Laboratories Inc.; molecular weight cutoff=8,000). The aqueous solution obtained after dialysis was dried in an environment having a relative humidity of 50% and a temperature of 23° C. to 25° C. to form a film of 1±0.3 mm in thickness. The formed film was dried in a vacuum dryer at a temperature of 60° C. for 10 hours, was cut to obtain a film piece, and the mass W0 of the obtained film piece was precisely weighed. Next, the obtained film piece was immersed in a $LiPF_6$ solution of 1.0 M in concentration (solvent: mixed solvent of ethylene carbonate (EC)/ethyl methyl carbonate (EMC)=3/7 (volume ratio); additive: containing 2 volume % of vinylene carbonate (solvent ratio)) as an electrolyte solution in an environment having a temperature of 60° C. for 3 days, and was allowed to swell. The swollen film piece was subsequently pulled out and electrolyte solution on the surface thereof was wiped off using a KimWipe. The mass W1 of the film piece after swelling was then precisely weighed. The degree of swelling in electrolyte solution (=W1/W0 (factor)) was calculated.

<Solubility (20° C.) in Water>

The solubility (20° C.) of a graft copolymer in water was measured and evaluated by filtration as described below. Specifically, 10±0.5 g in terms of solid content of the graft copolymer was added to 100 g of deionized water and was mixed therewith by a disper blade (rotation speed: 2,000 rpm) for 2 hours in an environment having a temperature of 20° C. and a pH of 7. Next, the resultant mixture was passed through a 400-mesh screen to perform filtration. Residue remaining on the screen without passing through was weighed and was subtracted from the added mass of graft copolymer to calculate the mass (g) of graft copolymer that had dissolved in the deionized water as the solubility (20° C.) of the graft copolymer in water.

Solubility was evaluated as being sufficient in a case in which the solubility (20° C.) of the graft copolymer in water was 1 g/100 g-$H_2O$ or more (water-soluble; "A" evaluation) and was evaluated as being insufficient in a case in which the solubility (20° C.) of the graft copolymer in water was less than 1 g/100 g-$H_2O$ (not soluble; "B" evaluation).

<Grafting Ratio>

Removal (dialysis) of low molecular weight components such as unreacted monomer and homopolymer produced in graft polymerization from 50 g of an aqueous solution containing a graft copolymer was performed using a Spectra/Por 6 dialysis membrane (produced by Spectrum Laboratories Inc.; molecular weight cutoff=8,000). The amount of monomer (water-soluble monomer) that had been graft polymerized with a backbone polymer (i.e., the amount of a branch polymer) was determined based on the amount of monomer (water-soluble monomer) that was added into the system for graft polymerization and the rate of reduction of solid content of the aqueous solution through dialysis, and then the grafting ratio (mass %) was calculated by the following formula.

Grafting ratio (mass %)=Amount of graft polymerized monomer (water-soluble monomer) (g)/Amount of backbone polymer (g)×100

<Viscosity Stability>

The viscosity η0 of an obtained slurry composition was measured using a B-type viscometer (produced by Toki Sangyo Co., Ltd.; product name: TVB-10; rotation speed: 60 rpm). Next, the slurry composition for which the viscosity had been measured was stirred for 24 hours using a planetary mixer (rotation speed: 60 rpm). The viscosity η1 of the slurry composition after stirring was measured using the same type of B-type viscometer as described above (rotation speed: 60 rpm). The viscosity maintenance rate Δη of the slurry composition between before and after stirring was calculated (Δη=η1/η0×100(%)), and viscosity stability of the slurry composition was evaluated by the following standard. The temperature during viscosity measurement was 25° C. A viscosity maintenance rate Δη of closer to 100% indicates that the slurry composition has better viscosity stability.

A: Viscosity maintenance rate Δη of not less than 90% and not more than 110%

B: Viscosity maintenance rate Δη of not less than 80% and less than 90%

C: Viscosity maintenance rate Δη of not less than 70% and less than 80%

D: Viscosity maintenance rate Δη of less than 70% or more than 110%

<Inhibition of Spring-Back>

The spring-back of a negative electrode was evaluated based on negative electrode mixed material layer density. Specifically, the negative electrode mixed material layer side of a produced negative electrode web was first roll pressed at a line pressure of 11 t (tons) in an environment having a temperature of 25±3° C. to adjust the negative electrode mixed material layer density to 1.70 g/cm$^3$. Thereafter, the negative electrode was left in an environment having a temperature of 25±3° C. and a relative humidity of 50±5% for 1 week. The negative electrode mixed material layer density (g/cm$^3$) of the negative electrode after being left was measured and was evaluated by the following standard. A higher negative electrode mixed material layer density after being left indicates that spring-back of the negative electrode is inhibited.

A: Negative electrode mixed material layer density after being left of 1.65 g/cm$^3$ or more B: Negative electrode mixed material layer density after being left of not less than 1.60 g/cm$^3$ and less than 1.65 g/cm$^3$ C: Negative electrode mixed material layer density after being left of not less than 1.50 g/cm$^3$ and less than 1.60 g/cm$^3$ D: Negative electrode mixed material layer density after being left of less than 1.50 g/cm$^3$ <Peel Strength>

A produced negative electrode was cut out as a rectangle of 100 mm in length by 10 mm in width to obtain a test specimen. Next, the surface corresponding to the negative electrode mixed material layer was placed facing downward and cellophane tape (tape prescribed by JIS Z1522) was affixed to the surface of the negative electrode mixed material layer. The stress (N/m) when the current collector was peeled off by pulling one end of the current collector in a perpendicular direction at a pulling speed of 50 mm/min was measured. (Note that the cellophane tape was secured to a test stage.) Three measurements were performed in the same manner as described above, and the average value thereof was determined and was evaluated by the following standard. A larger average value for the stress indicates that the negative electrode has better peel strength.

A: Stress average value of 2.5 N/m or more

B: Stress average value of not less than 2.0 N/m and less than 2.5 N/m

C: Stress average value of not less than 1.5 N/m and less than 2.0 N/m

D: Stress average value of less than 1.5 N/m

<Inhibition of Surface Lithium Deposition>

A produced secondary battery was fully charged to a state of charge (SOC) of 100% with a 1C constant current in an environment having a temperature of −10° C. The fully charged secondary battery was disassembled to remove the negative electrode, and the surface state of a negative electrode mixed material layer of the negative electrode was inspected. The area of lithium deposited on the surface of the negative electrode mixed material layer was measured, and the rate of lithium deposition on the negative electrode (=(area of deposited lithium/area of surface of negative electrode mixed material layer)×100(%)) was calculated. The rate of lithium deposition was evaluated by the following standard. A smaller rate of lithium deposition is better for a secondary battery.

A: Rate of lithium deposition of less than 10%

B: Rate of lithium deposition of not less than 10% and less than 20%

C: Rate of lithium deposition of not less than 20% and less than 30%

D: Rate of lithium deposition of 30% or more

<Inhibition of Swelling>

A produced secondary battery was left at rest in an environment having a temperature of 25° C. for 5 hours while in a state with the electrodes thereof immersed in electrolyte solution. Next, the secondary battery that had been left at rest was charged to a cell voltage of 3.65 V by a constant-current method at a rate of 0.2C in an environment having a temperature of 25° C. The charged secondary battery was subsequently subjected to 12 hours of aging in an environment having a temperature of 60° C. Next, the secondary battery that had undergone aging was discharged to a cell voltage of 3.00 V by a constant-current method at a rate of 0.2C in an environment having a temperature of 25° C. The discharged secondary battery was disassembled, and a value obtained by subtracting the thickness of the current collector from the thickness of the entire negative electrode was measured as the pre-cycling thickness (d0) of the negative electrode.

Next, the secondary battery was reassembled and was then subjected to 50 cycles of a charge/discharge operation under conditions of a cell voltage of 4.20 V to 3.00 V and charge/discharge rate of 1C in an environment having a temperature of 25° C. Finally, the secondary battery that had undergone 50 cycles was charged at a rate of 1C in an environment having a temperature of 25° C. The charged secondary battery was disassembled to remove the negative electrode, and a value obtained by subtracting the thickness of the current collector from the thickness of the entire negative electrode was measured as the post-cycling thickness (d1) of the negative electrode. A rate of change of the post-cycling thickness d1 of the negative electrode relative to the pre-cycling thickness d0 of the negative electrode was determined as the swelling of the post-cycling negative electrode (={(d1−d0)/d0}×100(%)), and was evaluated by the following standard. Smaller swelling of the post-cycling negative electrode indicates that the negative electrode mixed material layer maintains its structure even upon repeated charge/discharge cycling and that the secondary battery has a long service life.

A: Swelling of post-cycling negative electrode of less than 25%

B: Swelling of post-cycling negative electrode of not less than 25% and less than 30%

C: Swelling of post-cycling negative electrode of not less than 30% and less than 35%

D: Swelling of post-cycling negative electrode of 35% or more

<Flexibility>

A produced negative electrode was wound around a cylinder with the negative electrode mixed material layer thereof at the inside, and was evaluated based on the occurrence of cracking of the negative electrode mixed material layer after winding. More specifically, cylinders of 3.0 mm, 2.5 mm, 2.0 mm, and 1.5 mm in diameter were prepared, each negative electrode was wound around these cylinders in order from the cylinder having the largest diameter, and the negative electrode was evaluated by the following standard.

A: Cracking does not occur with 1.5 mm Ø cylinder

B: Cracking does not occur with 2.0 mm Ø cylinder but occurs with 1.5 mm Ø cylinder C: Cracking does not occur with 2.5 mm Ø cylinder but occurs with 2.0 mm Ø cylinder D: Cracking does not occur with 3.0 mm Ø cylinder but occurs with 2.5 mm Ø cylinder <Cycle Characteristics>

A produced secondary battery was left at rest at a temperature of 25° C. for 5 hours after injection of electrolyte solution. Next, the secondary battery was charged to a cell voltage of 3.65 V by a 0.2C constant-current method at a temperature of 25° C. and was then subjected to 12 hours of aging at a temperature of 60° C. The secondary battery was then discharged to a cell voltage of 3.00 V by a 0.2C constant-current method at a temperature of 25° C. Thereafter, the secondary battery was CC-CV charged (upper limit cell voltage: 4.40 V) by a 0.2C constant-current method and was CC discharged to 3.00 V by a 0.2C constant-current method.

The secondary battery was subsequently subjected to 300 cycles of a charge/discharge operation between cell voltages of 4.40 V and 3.00 V at a charge/discharge rate of 1.0C in an environment having a temperature of 25° C. The capacity of the $1^{st}$ cycle (i.e., the initial discharge capacity X1) and the discharge capacity X2 of the $300^{th}$ cycle were measured, and a rate of capacity change indicated by $\Delta C=(X2/X1)\times 100(\%)$ was calculated and was evaluated by the following standard. A larger value for the rate of capacity change indicates better cycle characteristics.

A: $\Delta C$ of 80% or more

B: $\Delta C$ of not less than 75% and less than 80%

C: $\Delta C$ of not less than 70% and less than 75%

D: $\Delta C$ of less than 70%

Example 1

<Production of Graft Copolymer>
<<Production of Backbone Polymer>>

A 1 L flask equipped with a septum was charged with 770 parts of deionized water. The deionized water was heated to a temperature of 40° C., and the inside of the flask was purged with nitrogen gas at a flow rate of 100 mL/min. Next, 35 parts of acrylic acid as an ethylenically unsaturated carboxylic acid monomer, 40 parts of acrylamide as a (meth)acrylamide monomer, and 25 parts of N-hydroxyethylacrylamide as a hydroxyl group-containing vinyl monomer were mixed and were then injected into the flask by a syringe. Thereafter, 6.5 parts (amount at start of reaction) of a 1.0% aqueous solution of sodium L-ascorbate as a polymerization accelerator was loaded into the flask by a syringe, and, 10 minutes later, 12.5 parts (amount at start of reaction) of a 2.0% aqueous solution of potassium persulfate as a polymerization initiator was added into the flask by a syringe. At 1 hour after the start of the reaction, the temperature was raised to 55° C. and a polymerization reaction was allowed to proceed. After 2 hours, 7.3 parts of a 1.0% aqueous solution of sodium bisulfite as a polymerization accelerator was loaded into the flask by a syringe, and, 10 minutes later, 9.4 parts of a 2.0% aqueous solution of potassium persulfate as a polymerization initiator was added into the flask by a syringe. After 3 hours, 7.3 parts of a 1.0% aqueous solution of sodium bisulfite as a polymerization accelerator was loaded into the flask by a syringe, and, 10 minutes later, 9.4 parts of a 2.0% aqueous solution of potassium persulfate as a polymerization initiator was added into the flask by a syringe. After 4 hours, 7.3 parts of a 1.0% aqueous solution of sodium bisulfite as a polymerization accelerator was loaded into the flask by a syringe, and, 10 minutes later, 9.4 parts of a 2.0% aqueous solution of potassium persulfate as a polymerization initiator was added into the flask by a syringe. After 5 hours, 7.3 parts of a 1.0% aqueous solution of sodium bisulfite as a polymerization accelerator was loaded into the flask by a syringe, and, 10 minutes later, 9.4 parts of a 2.0% aqueous solution of potassium persulfate as a polymerization initiator was added into the flask by a syringe. After 6 hours, a reaction inhibitor was added and the flask was opened to air to terminate the polymerization reaction. The product was subsequently adjusted to pH 8 using a 10% aqueous solution of lithium hydroxide to obtain an aqueous solution containing a backbone polymer including ethylenically unsaturated carboxylic acid monomer units, (meth)acrylamide monomer units, and hydroxyl group-containing vinyl monomer units. The weight-average molecular weight and the glass-transition temperature of the obtained backbone polymer were evaluated by the previously described methods. The results are shown in Table 1.

Note that the chemical composition of the obtained backbone polymer matched the proportions (charging proportions) of the monomers among all monomers used in polymerization of the backbone polymer.

<<Graft Polymerization>>

A 3 L flask equipped with a septum was charged with 100 parts of the backbone polymer obtained as described above and 948 parts of deionized water. These materials were heated to a temperature of 55° C., and the inside of the flask was purged with nitrogen gas at a flow rate of 100 mL/min. Next, 12 parts of acrylonitrile as a water-soluble monomer was injected into the flask by a syringe. Thereafter, 90.0 parts of a 1.0% aqueous solution of sodium bisulfite as a polymerization accelerator was loaded into the flask by a syringe, and, 10 minutes later, 120 parts of a 2.0% aqueous solution of potassium persulfate as a polymerization initiator was added into the flask by a syringe. After 6 hours, a reaction inhibitor was added and the flask was opened to air to terminate the polymerization reaction. The product was subsequently adjusted to pH 8 using a 10% aqueous solution of lithium hydroxide to obtain an aqueous solution containing a graft copolymer having a structure in which a branch polymer composed of only acrylonitrile units was bonded to the backbone polymer. The degree of swelling in electrolyte solution, solubility (20° C.) in water, and grafting ratio of the graft copolymer were evaluated by the previously described methods. The results are shown in Table 1.

<Production of Particulate Polymer>

A 5 MPa pressure vessel equipped with a stirrer was charged with 65 parts of styrene as an aromatic vinyl monomer, 35 parts of 1,3-butadiene as an aliphatic conjugated diene monomer, 2 parts of itaconic acid as a carboxyl group-containing monomer, 1 part of 2-hydroxyethyl acrylate as a hydroxyl group-containing monomer, 0.3 parts of t-dodecyl mercaptan as a molecular weight modifier, 5 parts of sodium dodecylbenzenesulfonate as an emulsifier, 150 parts of deionized water as a solvent, and 1 part of potassium persulfate as a polymerization initiator. These materials were sufficiently stirred and were then heated to a temperature of 55° C. to initiate polymerization. Cooling was performed to quench the reaction once monomer consumption had reached 95.0%. The water dispersion containing a polymer that was obtained in this manner was adjusted to pH 8 through addition of 5% sodium hydroxide aqueous solution. Unreacted monomer was subsequently removed by thermal-vacuum distillation. Thereafter, cooling was performed to a temperature of 30° C. or lower to yield a water dispersion containing a styrene-butadiene copolymer as a particulate polymer including a carboxyl group and a hydroxyl group.

<Production of Binder Composition and Slurry Composition>

In the present example, a slurry composition that contained a binder composition containing the graft copolymer and the particulate polymer was produced as follows without producing the binder composition in advance of producing the slurry composition. In other words, the binder composition and the slurry composition were produced in the same step.

Specifically, 98 parts of artificial graphite (theoretical capacity: 360 mAh/g) as a negative electrode active material and 1 part in terms of solid content of the aqueous solution (solid content concentration: 4.5%) containing the graft copolymer that was obtained as described above were loaded into a planetary mixer. These materials were diluted to a solid content concentration of 60% with deionized water and were then kneaded at a rotation speed of 45 rpm for 60 minutes. Thereafter, 1 part in terms of solid content of the water dispersion (solid content concentration: 40%) of the particulate polymer obtained as described above was added and was kneaded therewith at a rotation speed of 40 rpm for 40 minutes. Deionized water was then added to adjust the viscosity to 3,500±500 mPa·s (measured by a B-type viscometer at 25° C. and 60 rpm) and thereby yield a slurry composition for a lithium ion secondary battery negative electrode.

The obtained slurry composition for a lithium ion secondary battery negative electrode was used in evaluation of slurry composition viscosity stability by the previously described method. The result is shown in Table 1.

<Production of Negative Electrode for Lithium Ion Secondary Battery>

The slurry composition for a lithium ion secondary battery negative electrode was applied onto the surface of copper foil (current collector) of 15 μm in thickness by a comma coater such as to have a coating weight (mass per unit area of negative electrode mixed material layer) of 11.0 mg/cm'. The copper foil with the slurry composition for a lithium ion secondary battery negative electrode applied thereon was subsequently conveyed inside an 80° C. oven for 2 minutes and a 110° C. oven for 2 minutes at a speed of 400 mm/min so as to dry the slurry composition on the copper foil and obtain a negative electrode web including a negative electrode mixed material layer formed on the current collector.

The obtained negative electrode web was used to evaluate negative electrode spring-back by the previously described method. The result is shown in Table 1.

Next, the obtained negative electrode web was roll pressed to adjust the negative electrode mixed material layer density to 1.68 g/cm$^3$ to 1.72 g/cm$^3$. The resultant product was then left under vacuum conditions in an environment having a temperature of 105° C. for 4 hours to obtain a negative electrode for a lithium ion secondary battery.

The obtained negative electrode was used to evaluate negative electrode peel strength and flexibility by the previously described methods. The results are shown in Table 1.

<Production of Positive Electrode for Lithium Ion Secondary Battery>

A slurry composition for a lithium ion secondary battery positive electrode was produced by adding 100 parts of $LiCoO_2$ as a positive electrode active material, 2 parts of acetylene black (produced by Denka Company Limited; product name: HS-100) as a conductive material, and 2 parts of polyvinylidene fluoride (produced by Kureha Corporation; product name KF-1100) as a binder into a planetary mixer, further adding 2-methylpyrrolidone as a dispersion medium such that the total solid content concentration was 67%, and mixing these materials.

Next, the obtained slurry composition for a lithium ion secondary battery positive electrode was applied onto aluminum foil (current collector) of 20 μm in thickness by a comma coater such as to having a coating weight of 26.0 mg/cm$^2$ to 27.0 mg/cm$^2$. The aluminum foil with the slurry composition for a lithium ion secondary battery positive electrode applied thereon was subsequently conveyed inside a 60° C. oven for 2 minutes at a speed of 0.5 m/min so as to dry the slurry composition. Thereafter, 2 minutes of heat treatment was performed at a temperature of 120° C. to obtain a positive electrode web.

The obtained positive electrode web was pressed by a roll press to adjust the positive electrode mixed material layer density to 3.40 g/cm$^3$ to 3.50 g/cm$^3$ and was left under vacuum conditions in an environment having a temperature of 120° C. for 3 hours with the aim of removing the dispersion medium to thereby obtain a positive electrode.

<Production of Lithium Ion Secondary Battery>

A wound cell (discharge capacity equivalent to 520 mAh) was produced using a single-layer separator made from polypropylene and the above-described negative and positive electrodes and was placed inside aluminum packing. Thereafter, the aluminum packing was filled with $LiPF_6$ solution of 1.0 M in concentration (solvent: mixed solvent of ethylene carbonate (EC)/ethyl methyl carbonate (EMC)=3/7 (volume ratio); additive: containing 2 volume % of vinylene carbonate (solvent ratio)) as an electrolyte solution. The aluminum packing was then closed by heat sealing at a temperature of 150° C. to tightly seal an opening of the aluminum packing, and thereby produce a lithium ion secondary battery.

The obtained lithium ion secondary battery was used to evaluate inhibition of negative electrode swelling, inhibition of lithium deposition on the negative electrode surface, and cycle characteristics by the previously described methods. The results are shown in Table 1.

Example 2

In production of a backbone polymer, the amount of a 1.0% aqueous solution of sodium L-ascorbate at the start of the reaction was changed from 6.5 parts to 5.2 parts and the amount of a 2.0% aqueous solution of potassium persulfate at the start of the reaction was changed from 12.5 parts to 10 parts. With the exception of the above, a backbone polymer, a graft copolymer, a particulate polymer, a binder composition, a slurry composition, a negative electrode, a positive electrode, and a secondary battery were produced in the same way as in Example 1. Measurements and evaluations were also performed in the same way as in Example 1. The results are shown in Table 1.

Example 3

In production of a backbone polymer, the amount of acrylic acid was changed to 30 parts, the amount of acrylamide was changed to 35 parts, and the amount of N-hydroxyethylacrylamide was changed to 35 parts. With the exception of the above, a backbone polymer, a graft copolymer, a particulate polymer, a binder composition, a slurry composition, a negative electrode, a positive electrode, and a secondary battery were produced in the same way as in Example 1. Measurements and evaluations were also performed in the same way as in Example 1. The results are shown in Table 1.

Example 4

In production of a backbone polymer, N-hydroxyethylacrylamide was changed to 2-hydroxyethyl acrylate. With the exception of the above, a backbone polymer, a graft copolymer, a particulate polymer, a binder composition, a slurry composition, a negative electrode, a positive electrode, and a secondary battery were produced in the same way as in Example 1. Measurements and evaluations were also performed in the same way as in Example 1. The results are shown in Table 1.

Example 5

In production of a backbone polymer, the amount of a 1.0% aqueous solution of sodium L-ascorbate at the start of the reaction was changed from 6.5 parts to 10 parts and the amount of a 2.0% aqueous solution of potassium persulfate at the start of the reaction was changed from 12.5 parts to 20 parts. With the exception of the above, a backbone polymer, a graft copolymer, a particulate polymer, a binder composition, a slurry composition, a negative electrode, a positive electrode, and a secondary battery were produced in the same way as in Example 1. Measurements and evaluations were also performed in the same way as in Example 1. The results are shown in Table 1.

Example 6

In production of a backbone polymer, the amount of a 1.0% aqueous solution of sodium L-ascorbate at the start of the reaction was changed from 6.5 parts to 4.0 parts and the amount of a 2.0% aqueous solution of potassium persulfate at the start of the reaction was changed from 12.5 parts to 7.5 parts. With the exception of the above, a backbone polymer, a graft copolymer, a particulate polymer, a binder composition, a slurry composition, a negative electrode, a positive electrode, and a secondary battery were produced in the same way as in Example 1. Measurements and evaluations were also performed in the same way as in Example 1. The results are shown in Table 1.

Example 7

In production of a backbone polymer, the amount of acrylic acid was changed to 25 parts, the amount of acrylamide was changed to 30 parts, and the amount of N-hydroxyethylacrylamide was changed to 45 parts. With the exception of the above, a backbone polymer, a graft copolymer, a particulate polymer, a binder composition, a slurry composition, a negative electrode, a positive electrode, and a secondary battery were produced in the same way as in Example 1. Measurements and evaluations were also performed in the same way as in Example 1. The results are shown in Table 1.

Example 8

In production of a backbone polymer, the amount of acrylic acid was changed to 3 parts, the amount of acrylamide was changed to 55 parts, and the amount of N-hydroxyethylacrylamide was changed to 42 parts. With the exception of the above, a backbone polymer, a graft copolymer, a particulate polymer, a binder composition, a slurry composition, a negative electrode, a positive electrode, and a secondary battery were produced in the same way as in Example 1. Measurements and evaluations were also performed in the same way as in Example 1. The results are shown in Table 1.

Example 9

In production of a backbone polymer, the amount of acrylic acid was changed to 70 parts, the amount of acrylamide was changed to 5 parts, and the amount of N-hydroxyethylacrylamide was changed to 25 parts. With the exception of the above, a backbone polymer, a graft copolymer, a particulate polymer, a binder composition, a slurry composition, a negative electrode, a positive electrode, and a secondary battery were produced in the same way as in Example 1. Measurements and evaluations were also performed in the same way as in Example 1. The results are shown in Table 1.

Example 10

In production of a graft copolymer by graft polymerization, the amount of acrylonitrile was changed to 3.5 parts. With the exception of the above, a backbone polymer, a graft copolymer, a particulate polymer, a binder composition, a slurry composition, a negative electrode, a positive electrode, and a secondary battery were produced in the same way as in Example 1.

Measurements and evaluations were also performed in the same way as in Example 1. The results are shown in Table 1.

Example 11

In production of a graft copolymer by graft polymerization, the amount of acrylonitrile was changed to 25 parts. With the exception of the above, a backbone polymer, a graft copolymer, a particulate polymer, a binder composition, a slurry composition, a negative electrode, a positive electrode, and a secondary battery were produced in the same way as in Example 1. Measurements and evaluations were also performed in the same way as in Example 1. The results are shown in Table 1.

Example 12

In production of a graft copolymer by graft polymerization, the amount of acrylonitrile was changed to 45 parts. With the exception of the above, a backbone polymer, a graft copolymer, a particulate polymer, a binder composition, a slurry composition, a negative electrode, a positive electrode, and a secondary battery were produced in the same way as in Example 1. Measurements and evaluations were also performed in the same way as in Example 1. The results are shown in Table 2.

Example 13

In production of a graft copolymer by graft polymerization, the amount of acrylonitrile was changed to 300 parts. With the exception of the above, a backbone polymer, a graft copolymer, a particulate polymer, a binder composition, a slurry composition, a negative electrode, a positive electrode, and a secondary battery were produced in the same way as in Example 1.

Measurements and evaluations were also performed in the same way as in Example 1. The results are shown in Table 2.

Example 14

In production of a graft copolymer by graft polymerization, acrylonitrile was changed to styrene. With the exception of the above, a backbone polymer, a graft copolymer, a particulate polymer, a binder composition, a slurry composition, a negative electrode, a positive electrode, and a secondary battery were produced in the same way as in Example 1. Measurements and evaluations were also performed in the same way as in Example 1. The results are shown in Table 2.

Example 15

In production of a graft copolymer by graft polymerization, acrylonitrile was changed to n-butyl acrylate. With the exception of the above, a backbone polymer, a graft copolymer, a particulate polymer, a binder composition, a slurry composition, a negative electrode, a positive electrode, and a secondary battery were produced in the same way as in Example 1. Measurements and evaluations were also performed in the same way as in Example 1. The results are shown in Table 2.

Example 16

In production of a graft copolymer by graft polymerization, 12 parts of acrylonitrile was changed to 20 parts of sodium styrenesulfonate. With the exception of the above, a backbone polymer, a graft copolymer, a particulate polymer, a binder composition, a slurry composition, a negative electrode, a positive electrode, and a secondary battery were produced in the same way as in Example 1. Measurements and evaluations were also performed in the same way as in Example 1. The results are shown in Table 2.

Example 17

In production of a slurry composition, 98 parts of artificial graphite as a negative electrode active material was changed to 88.2 parts of artificial graphite (theoretical capacity: 360 mAh/g) and 9.8 parts of $SiO_x$ (theoretical capacity: 2,300 mAh/g). With the exception of the above, a backbone polymer, a graft copolymer, a particulate polymer, a binder composition, a slurry composition, a negative electrode, a positive electrode, and a secondary battery were produced in the same way as in Example 1. Measurements and evaluations were also performed in the same way as in Example 1. The results are shown in Table 2.

Comparative Example 1

In production of a backbone polymer, the amount of acrylic acid was changed to 46 parts, the amount of acrylamide was changed to 51 parts, and the amount of N-hydroxyethylacrylamide was changed to 3 parts. With the exception of the above, a backbone polymer, a graft copolymer, a particulate polymer, a binder composition, a slurry composition, a negative electrode, a positive electrode, and a secondary battery were produced in the same way as in Example 1. Measurements and evaluations were also performed in the same way as in Example 1. The results are shown in Table 2.

Comparative Example 2

In production of a backbone polymer, the amount of acrylic acid was changed to 2 parts, the amount of acrylamide was changed to 3 parts, and the amount of N-hydroxyethylacrylamide was changed to 95 parts. With the exception of the above, a backbone polymer, a graft copolymer, a particulate polymer, a binder composition, a slurry composition, a negative electrode, a positive electrode, and a secondary battery were produced in the same way as in Example 1. Measurements and evaluations were also performed in the same way as in Example 1. The results are shown in Table 2.

Comparative Example 3

In production of a backbone polymer, the amount of a 1.0% aqueous solution of sodium L-ascorbate at the start of the reaction was changed from 6.5 parts to 20 parts and the amount of a 2.0% aqueous solution of potassium persulfate at the start of the reaction was changed from 12.5 parts to 40 parts. With the exception of the above, a backbone polymer, a graft copolymer, a particulate polymer, a binder composition, a slurry composition, a negative electrode, a positive electrode, and a secondary battery were produced in the same way as in Example 1. Measurements and evaluations were also performed in the same way as in Example 1. The results are shown in Table 2.

Comparative Example 4

Graft polymerization was not performed with respect to a backbone polymer and thus a backbone polymer was used instead of a graft copolymer in production of a binder composition and a slurry composition. With the exception of the above, a backbone polymer, a particulate polymer, a binder composition, a slurry composition, a negative electrode, a positive electrode, and a secondary battery were produced in the same way as in Example 1. Measurements and evaluations were also performed in the same way as in Example 1 with the exception that the backbone polymer was used as a measurement target for the degree of swelling in electrolyte solution and the solubility (20° C.) in water, and the grafting ratio was not measured. The results are shown in Table 2.

Comparative Example 5

In production of a graft copolymer by graft polymerization, 12 parts of acrylonitrile was changed to 50 parts of 2-acrylamido-2-methylpropane sulfonic acid (solubility (20° C.) in water: 100 g/100 g-$H_2O$). With the exception of the above, a backbone polymer, a graft copolymer, a particulate polymer, a binder composition, a slurry composition, a negative electrode, a positive electrode, and a secondary battery were produced in the same way as in Example 1. Measurements and evaluations were also performed in the same way as in Example 1. The results are shown in Table 2.

In Tables 1 and 2, shown below:
"AA" indicates acrylic acid unit;
"AAm" indicates acrylamide unit;
"HEAAm" indicates N-hydroxyethylacrylamide unit;

"2-HEA" indicates 2-hydroxyethyl acrylate unit;
"AN" indicates acrylonitrile unit;
"ST" indicates styrene unit;
"BA" indicates n-butyl acrylate unit;
"NaSS" indicates sodium styrenesulfonate unit;
"AMPS" indicates 2-acrylamido-2-methylpropane sulfonic acid unit; and
"SBR" indicates styrene-butadiene copolymer.

TABLE 1

| | | | | | | Example 1 | Example 2 | Example 3 | Example 4 |
|---|---|---|---|---|---|---|---|---|---|
| Binder composition | Graft copolymer | Backbone polymer | Chemical composition | Ethylenically unsaturated carboxylic acid monomer unit | Type | AA | AA | AA | AA |
| | | | | | Content [mass %] | 35 | 35 | 30 | 35 |
| | | | | (Meth)acrylamide monomer unit | Type | AAm | AAm | AAm | AAm |
| | | | | | Content [mass %] | 40 | 40 | 35 | 40 |
| | | | | Hydroxyl group-containing vinyl monomer unit | Type | HEAAm | HEAAm | HEAAm | 2-HEA |
| | | | | | Content [mass %] | 25 | 25 | 35 | 25 |
| | | | Weight-average molecular weight [—] | | | $7.41 \times 10^6$ | $10.9 \times 10^6$ | $8.12 \times 10^6$ | $7.60 \times 10^6$ |
| | | | Glass-transition temperature [° C.] | | | 131 | 131 | 128 | 131 |
| | | Branch polymer | Chemical composition | Water-soluble monomer unit | Type | AN | AN | AN | AN |
| | | | | | Content [mass %] | 100 | 100 | 100 | 100 |
| | | Grafting ratio [mass %] | | | | 5.5 | 5.5 | 8.0 | 5.0 |
| | | Degree of swelling in electrolyte solution [factor] | | | | 1.2 | 1.2 | 1.2 | 1.2 |
| | | Solubility (20° C.) in water (A or B evaluation) | | | | A | A | A | A |
| | Particulate polymer | Type | | | | SBR | SBR | SBR | SBR |
| Mass per unit area of negative electrode mixed material layer [mg/cm$^2$] | | | | | | 11.0 | 11.0 | 11.0 | 11.0 |
| Type of negative electrode active material | | | | | | Graphite | Graphite | Graphite | Graphite |
| Peel strength of negative electrode | | | | | | A | A | A | A |
| Inhibition of negative electrode spring-back | | | | | | A | A | A | A |
| Inhibition of negative electrode lithium deposition | | | | | | A | A | A | A |
| Cycle characteristics of secondary battery | | | | | | A | A | A | A |
| Inhibition of negative electrode swelling | | | | | | A | A | A | A |
| Viscosity stability of slurry composition | | | | | | A | A | A | A |
| Flexibility of negative electrode | | | | | | A | A | A | A |

| | | | | | | Example 5 | Example 6 | Example 7 | Example 8 |
|---|---|---|---|---|---|---|---|---|---|
| Binder composition | Graft copolymer | Backbone polymer | Chemical composition | Ethylenically unsaturated carboxylic acid monomer unit | Type | AA | AA | AA | AA |
| | | | | | Content [mass %] | 35 | 35 | 25 | 3 |
| | | | | (Meth)acrylamide monomer unit | Type | AAm | AAm | AAm | AAm |
| | | | | | Content [mass %] | 40 | 40 | 30 | 55 |
| | | | | Hydroxyl group-containing vinyl monomer unit | Type | HEAAm | HEAAm | HEAAm | HEAAm |
| | | | | | Content [mass %] | 25 | 25 | 45 | 42 |
| | | | Weight-average molecular weight [—] | | | $2.00 \times 10^6$ | $16.0 \times 10^6$ | $10.2 \times 10^6$ | $9.80 \times 10^6$ |
| | | | Glass-transition temperature [° C.] | | | 131 | 131 | 125 | 142 |
| | | Branch polymer | Chemical composition | Water-soluble monomer unit | Type | AN | AN | AN | AN |
| | | | | | Content [mass %] | 100 | 100 | 100 | 100 |
| | | Grafting ratio [mass %] | | | | 5.5 | 5.5 | 5.5 | 15.0 |
| | | Degree of swelling in electrolyte solution [factor] | | | | 1.2 | 1.2 | 1.2 | 1.2 |
| | | Solubility (20° C.) in water (A or B evaluation) | | | | A | A | A | A |
| | Particulate polymer | Type | | | | SBR | SBR | SBR | SBR |
| Mass per unit area of negative electrode mixed material layer [mg/cm$^2$] | | | | | | 11.0 | 11.0 | 11.0 | 11.0 |
| Type of negative electrode active material | | | | | | Graphite | Graphite | Graphite | Graphite |
| Peel strength of negative electrode | | | | | | B | A | B | B |
| Inhibition of negative electrode spring-back | | | | | | A | B | A | B |
| Inhibition of negative electrode lithium deposition | | | | | | A | B | B | B |

TABLE 1-continued

| | Example 9 | Example 10 | Example 11 | Example 12 |
|---|---|---|---|---|
| Cycle characteristics of secondary battery | B | A | B | B |
| Inhibition of negative electrode swelling | B | A | A | B |
| Viscosity stability of slurry composition | A | A | A | B |
| Flexibility of negative electrode | A | B | A | B |

| | | | | | | | Example 9 | Example 10 | Example 11 |
|---|---|---|---|---|---|---|---|---|---|
| Binder compo- sition | Graft copolymer | Backbone polymer | Chemical compo- sition | Ethylenically unsaturated carboxylic acid monomer unit | Type | | AA | AA | AA |
| | | | | | Content [mass %] | | 70 | 35 | 35 |
| | | | | (Meth)acryl- amide monomer unit | Type | | AAm | AAm | AAm |
| | | | | | Content [mass %] | | 5 | 40 | 40 |
| | | | | Hydroxyl group- containing vinyl monomer unit | Type | | HEAAm | HEAAm | HEAAm |
| | | | | | Content [mass %] | | 25 | 25 | 25 |
| | | | Weight-average molecular weight [—] | | | | $7.41 \times 10^6$ | $7.41 \times 10^6$ | $7.41 \times 10^6$ |
| | | | Glass-transition temperature [° C.] | | | | 108 | 131 | 131 |
| | | Branch polymer | Chemical compo- sition | Water- soluble monomer unit | Type | | AN | AN | AN |
| | | | | | Content [mass %] | | 100 | 100 | 100 |
| | | Grafting ratio [mass %] | | | | | 5.5 | 1.5 | 10.5 |
| | | Degree of swelling in electrolyte solution [factor] | | | | | 1.2 | 1.1 | 1.3 |
| | | Solubility (20° C.) in water (A or B evaluation) | | | | | A | A | A |
| | Particulate polymer | Type | | | | | SBR | SBR | SBR |
| Mass per unit area of negative electrode mixed material layer [mg/cm²] | | | | | | | 11.0 | 11.0 | 11.0 |
| Type of negative electrode active material | | | | | | | Graphite | Graphite | Graphite |
| Peel strength of negative electrode | | | | | | | C | B | A |
| Inhibition of negative electrode spring-back | | | | | | | C | A | A |
| Inhibition of negative electrode lithium deposition | | | | | | | C | B | A |
| Cycle characteristics of secondary battery | | | | | | | C | B | B |
| Inhibition of negative electrode swelling | | | | | | | C | B | A |
| Viscosity stability of slurry composition | | | | | | | C | A | A |
| Flexibility of negative electrode | | | | | | | C | B | A |

TABLE 2

| | | | | | | | Example 12 | Example 13 | Example 14 | Example 15 |
|---|---|---|---|---|---|---|---|---|---|---|
| Binder compo- sition | Graft copolymer | Backbone polymer | Chemical compo- sition | Ethylenically unsaturated carboxylic acid monomer unit | Type | | AA | AA | AA | AA |
| | | | | | Content [mass %] | | 35 | 35 | 35 | 35 |
| | | | | (Meth)acryl- amide monomer unit | Type | | AAm | AAm | AAm | AAm |
| | | | | | Content [mass %] | | 40 | 40 | 40 | 40 |
| | | | | Hydroxyl group- containing vinyl monomer unit | Type | | HEAAm | HEAAm | HEAAm | HEAAm |
| | | | | | Content [mass %] | | 25 | 25 | 25 | 25 |
| | | | Weight-average molecular weight [—] | | | | $7.41 \times 10^6$ | $7.41 \times 10^6$ | $7.41 \times 10^6$ | $7.41 \times 10^6$ |
| | | | Glass-transition temperature [° C.] | | | | 131 | 131 | 131 | 131 |
| | | Branch polymer | Chemical compo- sition | Water- soluble monomer unit | Type | | AN | AN | ST | BA |
| | | | | | Content [mass %] | | 100 | 100 | 100 | 100 |
| | | Grafting ratio [mass %] | | | | | 21.5 | 150.0 | 1.5 | 3.5 |
| | | Degree of swelling in electrolyte solution [factor] | | | | | 1.6 | 2.2 | 1.2 | 1.2 |
| | | Solubility (20° C.) in water (A or B evaluation) | | | | | A | A | A | A |
| | Particulate polymer | Type | | | | | SBR | SBR | SBR | SBR |
| Mass per unit area of negative electrode mixed material layer [mg/cm²] | | | | | | | 11.0 | 11.0 | 11.0 | 11.0 |
| Type of negative electrode active material | | | | | | | Graphite | Graphite | Graphite | Graphite |
| Peel strength of negative electrode | | | | | | | A | B | B | B |
| Inhibition of negative electrode spring-back | | | | | | | A | B | A | A |

TABLE 2-continued

| | Example 16 | Example 17 | Comparative Example 1 | Comparative Example 2 |
|---|---|---|---|---|
| Inhibition of negative electrode lithium deposition | A | B | A | A |
| Cycle characteristics of secondary battery | B | C | B | A |
| Inhibition of negative electrode swelling | B | C | B | A |
| Viscosity stability of slurry composition | A | A | A | A |
| Flexibility of negative electrode | A | B | B | A |

| | | | | | | | Example 16 | Example 17 | Comparative Example 1 | Comparative Example 2 |
|---|---|---|---|---|---|---|---|---|---|---|
| Binder composition | Graft copolymer | Backbone polymer | Chemical composition | Ethylenically unsaturated carboxylic acid monomer unit | Type | AA | AA | AA | AA |
| | | | | | Content [mass %] | 35 | 35 | 46 | 2 |
| | | | | (Meth)acrylamide monomer unit | Type | AAm | AAm | AAm | AAm |
| | | | | | Content [mass %] | 40 | 40 | 51 | 3 |
| | | | | Hydroxyl group-containing vinyl monomer unit | Type | HEAAm | HEAAm | HEAAm | HEAAm |
| | | | | | Content [mass %] | 25 | 25 | 3 | 95 |
| | | | Weight-average molecular weight [—] | | | $7.41 \times 10^6$ | $7.41 \times 10^6$ | $6.37 \times 10^6$ | $8.40 \times 10^6$ |
| | | | Glass-transition temperature [° C.] | | | 131 | 131 | 136 | 101 |
| | | Branch polymer | Chemical composition | Water-soluble monomer unit | Type | NaSS | AN | AN | AN |
| | | | | | Content [mass %] | 100 | 100 | 100 | 100 |
| | | Grafting ratio [mass %] | | | | 2.0 | 5.5 | 5.0 | 5.5 |
| | | Degree of swelling in electrolyte solution [factor] | | | | 1.2 | 1.2 | 1.2 | 1.2 |
| | | Solubility (20° C.) in water (A or B evaluation) | | | | A | A | A | A |
| | Particulate polymer | Type | | | | SBR | SBR | SBR | SBR |
| Mass per unit area of negative electrode mixed material layer [mg/cm²] | | | | | | 11.0 | 10.0 | 11.0 | 11.0 |
| Type of negative electrode active material | | | | | | Graphite | Graphite + $SiO_x$ | Graphite | Graphite |
| Peel strength of negative electrode | | | | | | B | A | D | D |
| Inhibition of negative electrode spring-back | | | | | | B | A | D | C |
| Inhibition of negative electrode lithium deposition | | | | | | A | A | D | D |
| Cycle characteristics of secondary battery | | | | | | B | B | D | D |
| Inhibition of negative electrode swelling | | | | | | B | A | D | D |
| Viscosity stability of slurry composition | | | | | | A | A | C | C |
| Flexibility of negative electrode | | | | | | A | A | D | C |

| | | | | | | | Comparative Example 3 | Comparative Example 4 | Comparative Example 5 |
|---|---|---|---|---|---|---|---|---|---|
| | Binder composition | Graft copolymer | Backbone polymer | Chemical composition | Ethylenically unsaturated carboxylic acid monomer unit | Type | AA | AA | AA |
| | | | | | | Content [mass %] | 35 | 35 | 35 |
| | | | | | (Meth)acrylamide monomer unit | Type | AAm | AAm | AAm |
| | | | | | | Content [mass %] | 40 | 40 | 40 |
| | | | | | Hydroxyl group-containing vinyl monomer unit | Type | HEAAm | HEAAm | HEAAm |
| | | | | | | Content [mass %] | 25 | 25 | 25 |
| | | | | Weight-average molecular weight [—] | | | $0.35 \times 10^6$ | $7.41 \times 10^6$ | $7.41 \times 10^6$ |
| | | | | Glass-transition temperature [° C.] | | | 131 | 131 | 131 |
| | | | Branch polymer | Chemical composition | Water-soluble monomer unit | Type | AN | — | AMPS |
| | | | | | | Content [mass %] | 100 | — | 100 |
| | | | Grafting ratio [mass %] | | | | 5.5 | — | 1.1 |
| | | | Degree of swelling in electrolyte solution [factor] | | | | 1.2 | 1.1 | 1.1 |
| | | | Solubility (20° C.) in water (A or B evaluation) | | | | A | A | A |
| | | Particulate polymer | Type | | | | SBR | SBR | SBR |
| | Mass per unit area of negative electrode mixed material layer [mg/cm²] | | | | | | 11.0 | 11.0 | 11.0 |
| | Type of negative electrode active material | | | | | | Graphite | Graphite | Graphite |
| | Peel strength of negative electrode | | | | | | D | D | D |

TABLE 2-continued

| | | | |
|---|---|---|---|
| Inhibition of negative electrode spring-back | C | D | D |
| Inhibition of negative electrode lithium deposition | D | D | D |
| Cycle characteristics of secondary battery | D | D | D |
| Inhibition of negative electrode swelling | D | D | D |
| Viscosity stability of slurry composition | C | D | C |
| Flexibility of negative electrode | D | D | D |

It can be seen from Tables 1 and 2 that in each of Examples 1 to 17 in which a negative electrode was produced using a binder composition containing a graft copolymer having a structure in which a branch polymer including a specific water-soluble monomer unit was bonded to a backbone polymer including a hydroxyl group-containing vinyl monomer unit in a proportion within a specific range and having a weight-average molecular weight within a specific range, it was possible to inhibit swelling of the negative electrode associated with charging and discharging while also causing a secondary battery to display excellent cycle characteristics. It can also be seen that in each of Examples 1 to 17, the slurry composition had excellent viscosity stability, the negative electrode had excellent peel strength and flexibility, and spring-back of the negative electrode and lithium deposition on the surface of the negative electrode were sufficiently inhibited.

On the other hand, it can be seen that negative electrode swelling associated with charging and discharging could not be inhibited and secondary battery cycle characteristics deteriorated in Comparative Example 1 in which the proportion in which a hydroxyl group-containing vinyl monomer unit was included in a backbone polymer of a graft copolymer was less than a specific value. It can also be seen that the negative electrode had poor peel strength and flexibility, and spring-back of the negative electrode and lithium deposition on the surface of the negative electrode could not be sufficiently inhibited in Comparative Example 1.

Moreover, it can be seen that negative electrode swelling associated with charging and discharging could not be inhibited and secondary battery cycle characteristics deteriorated in Comparative Example 2 in which the proportion in which a hydroxyl group-containing vinyl monomer unit was included in a backbone polymer of a graft copolymer was more than a specific value. It can also be seen that the negative electrode had poor peel strength, and lithium deposition on the surface of the negative electrode could not be sufficiently inhibited in Comparative Example 2.

Furthermore, it can be seen that negative electrode swelling associated with charging and discharging could not be inhibited and secondary battery cycle characteristics deteriorated in Comparative Example 3 in which the weight-average molecular weight of a backbone polymer of a graft copolymer was less than a specific value. It can also be seen that the negative electrode had poor peel strength and flexibility, and lithium deposition on the surface of the negative electrode could not be sufficiently inhibited in Comparative Example 3.

Also, it can be seen that negative electrode swelling associated with charging and discharging could not be inhibited and secondary battery cycle characteristics deteriorated in Comparative Example 4 in which a backbone polymer that was not subjected to graft polymerization was used instead of a graft copolymer. It can also be seen that the slurry composition had poor viscosity stability, the negative electrode had poor peel strength and flexibility, and spring-back of the negative electrode and lithium deposition on the surface of the negative electrode could not be sufficiently inhibited in Comparative Example 4.

Moreover, it can be seen that negative electrode swelling associated with charging and discharging could not be inhibited and secondary battery cycle characteristics deteriorated in Comparative Example 5 in which a water-soluble monomer having a solubility (20° C.) in water that was more than a specific value was graft polymerized in production of a graft copolymer. It can also be seen that the negative electrode had poor peel strength and flexibility, and spring-back of the negative electrode and lithium deposition on the surface of the negative electrode could not be sufficiently inhibited in Comparative Example 5.

INDUSTRIAL APPLICABILITY

According to the present disclosure, it is possible to provide a binder composition for a non-aqueous secondary battery electrode and a slurry composition for a non-aqueous secondary battery electrode that can inhibit electrode swelling associated with repeated charging and discharging while also causing a secondary battery to display excellent cycle characteristics.

Moreover, according to the present disclosure, it is possible to provide an electrode for a non-aqueous secondary battery for which swelling associated with repeated charging and discharging is inhibited and that can cause a secondary battery to display excellent cycle characteristics.

Furthermore, according to the present disclosure, it is possible to provide a non-aqueous secondary battery having excellent cycle characteristics.

The invention claimed is:

1. A binder composition for a non-aqueous secondary battery electrode comprising a graft copolymer having a structure in which a branch polymer is bonded to a backbone polymer, wherein
the backbone polymer includes a hydroxyl group-containing vinyl monomer unit, derived from at least one of 2-hydroxyethyl acrylate, 2-hydroxyethyl methacrylate, 2-hydroxypropyl acrylate, 2-hydroxypropyl methacrylate, N-hydroxymethylacrylamide (N-methylolacrylamide), N-hydroxymethylmethacrylamide, N-hydroxyethylacrylamide, and N-hydroxyethylmethacrylamide, in a proportion of not less than 15 mass % and not more than 69 mass %; an ethylenically unsaturated carboxylic acid monomer unit, derived from at least one of ethylenically unsaturated monocarboxylic acids including acrylic acid, methacrylic acid, and crotonic acid, ethylenically unsaturated dicarboxylic acids including maleic acid, fumaric acid, and itaconic acid, derivatives of the ethylenically unsaturated monocarboxylic acids and ethylenically unsaturated dicarboxylic acids, and acid anhydrides of the ethylenically unsaturated dicarboxylic acids, in a proportion of not less than 10 mass % and not more than 50 mass %; a (meth)acrylamide monomer unit, derived from at least one of acrylamide and methacrylamide, in a proportion of not less than 30 mass % and not more than 60 mass %, the backbone polymer has a weight-average molecular weight of not less than $1.0 \times 10^6$ and not more than $2.0 \times 10^7$, and the branch polymer includes a water-soluble monomer unit that is formed from a water-soluble monomer having a solubility in water of not less than 0.01 g/100 g-$H_2O$ and not more than 25 g/100 g-$H_2O$ at a temperature of 20° C., and the water-soluble monomer is selected from a group consisting of acrylonitrile, n-butyl acrylate, styrene, ethyl acrylate, sodium styrenesulfonate, methacrylonitrile, and methacrylamide.

2. The binder composition for a non-aqueous secondary battery electrode according to claim 1, wherein the backbone polymer has a glass-transition temperature of not lower than ~10° C. and not higher than 150° C.

3. The binder composition for a non-aqueous secondary battery electrode according to claim 1, wherein the backbone polymer has a glass-transition temperature of not lower than 90° C. and not higher than 150° C.

4. The binder composition for a non-aqueous secondary battery electrode according to claim 1, wherein the graft copolymer has a grafting ratio of not less than 0.5 mass % and not more than 200 mass %.

5. The binder composition for a non-aqueous secondary battery electrode according to claim 1, wherein the graft copolymer has a grafting ratio of not less than 0.5 mass % and less than 10 mass %.

6. The binder composition for a non-aqueous secondary battery electrode according to claim 1, wherein the graft copolymer has a degree of swelling in electrolyte solution of more than a factor of 1 and not more than a factor of 2, and the electrolyte solution is a LiPF6 solution of 1.0 M in concentration (solvent: mixed solvent of ethylene carbonate/ethyl methyl carbonate=3/7 (volume ratio); additive: containing 2 volume % of vinylene carbonate (solvent ratio)).

7. The binder composition for a non-aqueous secondary battery electrode according to claim 1, wherein the graft copolymer has a solubility of 1 g/100 g-$H_2O$ or more at a temperature of 20° C.

8. The binder composition for a non-aqueous secondary battery electrode according to claim 1, further comprising a particulate polymer including either or both of a carboxyl group and a hydroxyl group.

9. A slurry composition for a non-aqueous secondary battery electrode comprising: an electrode active material; and the binder composition for a non-aqueous secondary battery electrode according to claim 1.

10. An electrode for a non-aqueous secondary battery comprising an electrode mixed material layer formed using the slurry composition for a non-aqueous secondary battery electrode according to claim 9.

11. The electrode for a non-aqueous secondary battery according to claim 10, wherein the electrode mixed material layer has a mass per unit area of 10.0 mg/cm$^2$ or more.

12. A non-aqueous secondary battery comprising the electrode for a non-aqueous secondary battery according to claim 10.

13. A binder composition for a non-aqueous secondary battery electrode comprising a graft copolymer having a structure in which a branch polymer is bonded to a backbone polymer, wherein the backbone polymer includes a hydroxyl group-containing vinyl monomer unit, derived from N-hydroxyethylacrylamide, in a proportion of not less than 15 mass % and not more than 69 mass %; an ethylenically unsaturated carboxylic acid monomer unit, derived from acrylic acid, in a proportion of not less than 10 mass % and not more than 50 mass %; a (meth)acrylamide monomer unit, derived from acrylamide, in a proportion of not less than 30 mass % and not more than 60 mass %, the backbone polymer has a weight-average molecular weight of not less than $1.0 \times 10^6$ and not more than $2.0 \times 10^7$, and the branch polymer includes a water-soluble monomer unit that is formed from acrylonitrile.

* * * * *